(12) United States Patent
Wei et al.

(10) Patent No.: US 7,618,709 B2
(45) Date of Patent: *Nov. 17, 2009

(54) FLUORESCENT ARTICLES HAVING MULTIPLE FILM LAYERS

(75) Inventors: Guang-Xue Wei, Deerfield, IL (US); Drew J. Buoni, Chicago, IL (US)

(73) Assignee: Avery Dennison Corporation, Mentor, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/354,515

(22) Filed: Jan. 30, 2003

(65) Prior Publication Data

US 2003/0203212 A1 Oct. 30, 2003

Related U.S. Application Data

(63) Continuation-in-part of application No. 10/135,537, filed on Apr. 30, 2002, now Pat. No. 7,264,880.

(51) Int. Cl.
*B32B 9/04* (2006.01)

(52) U.S. Cl. ............... 428/411.1; 428/412; 428/423.1; 428/480; 428/500; 359/529; 359/530

(58) Field of Classification Search .............. 428/423.1, 428/411.1, 412, 480, 500, 529, 530
See application file for complete search history.

(56) References Cited

U.S. PATENT DOCUMENTS

| | | |
|---|---|---|
| 3,830,682 A | 8/1974 | Rowland |
| 4,486,363 A | 12/1984 | Pricone et al. |
| 4,601,861 A | 7/1986 | Pricone et al. |
| 5,005,873 A | 4/1991 | West |
| 5,117,304 A | 5/1992 | Huang et al. |
| 5,387,458 A | 2/1995 | Pavelka et al. |
| 5,605,761 A | 2/1997 | Burns et al. |
| 5,614,286 A | 3/1997 | Bacon, Jr. et al. |
| 5,672,643 A * | 9/1997 | Burns et al. .................. 524/90 |
| 5,674,622 A | 10/1997 | Burns et al. |
| 5,754,337 A | 5/1998 | Burns et al. |

(Continued)

FOREIGN PATENT DOCUMENTS

EP 0463260 A1 1/1992

(Continued)

OTHER PUBLICATIONS

PCT International Search Report—PCT/US03/10841, Apr. 4, 2003.
PCT International Search Report—PCT/US03/10842, Apr. 4, 2003.

*Primary Examiner*—Thao T. Tran
(74) *Attorney, Agent, or Firm*—Cook Alex Ltd.

(57) ABSTRACT

Articles are provided which have fluorescent properties and which are suitable for use in making retroreflective articles such as safety and informational signage. The articles have at least two film layers, each film layer including a colorant dye. The multiple film layer sheeting exhibits excellent resistance to weathering and overall color durability while also providing chromaticity properties dictated by industry standards for a particular coloration. A method of preparing the articles is provided. In a particular application, the articles embody retroreflective properties and are fluorescent yellow signs.

78 Claims, 7 Drawing Sheets

U.S. PATENT DOCUMENTS

| | | | |
|---|---|---|---|
| 5,920,429 A | 7/1999 | Burns et al. | |
| 6,001,936 A | 12/1999 | Barrera et al. | |
| 6,015,214 A | 1/2000 | Heenan et al. | |
| 6,110,566 A | 8/2000 | White et al. | |
| 6,251,963 B1 * | 6/2001 | Kohler et al. | 522/64 |
| 6,312,132 B1 | 11/2001 | Pavelka et al. | |
| 6,323,266 B2 | 11/2001 | Phillips | |
| 6,375,776 B1 | 4/2002 | Buoni et al. | |
| 6,464,898 B1 * | 10/2002 | Tomoike et al. | 252/301.35 |
| 6,514,594 B1 | 2/2003 | Wei et al. | |
| 6,531,205 B1 | 3/2003 | Buoni et al. | |
| 6,972,147 B1 * | 12/2005 | Wei et al. | 428/141 |
| 7,264,880 B2 * | 9/2007 | Wei et al. | 428/412 |
| 2007/0184278 A1 * | 8/2007 | Wei et al. | 428/411.1 |

FOREIGN PATENT DOCUMENTS

| | | |
|---|---|---|
| EP | 0812896 A1 | 12/1997 |
| EP | 1 008 440 A2 | 6/2000 |
| GB | 2 300 596 A | 11/1996 |
| JP | 2-16042 | 1/1990 |
| JP | 4-55474 | 2/1992 |
| JP | 9-31369 | 2/1997 |
| JP | 2001-092393 | 6/2001 |
| JP | 2001-174809 | 6/2001 |
| WO | WO 98/14802 | 4/1998 |
| WO | WO 99/48961 | 9/1999 |
| WO | WO 00/47407 | 8/2000 |

* cited by examiner

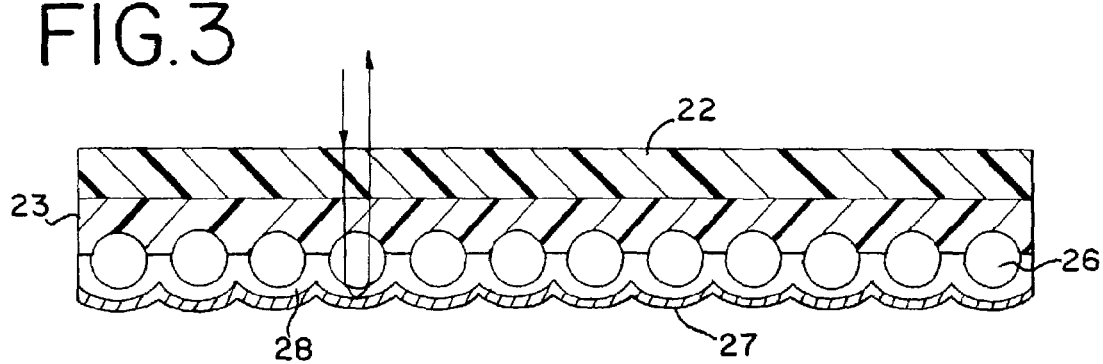
FIG. 3
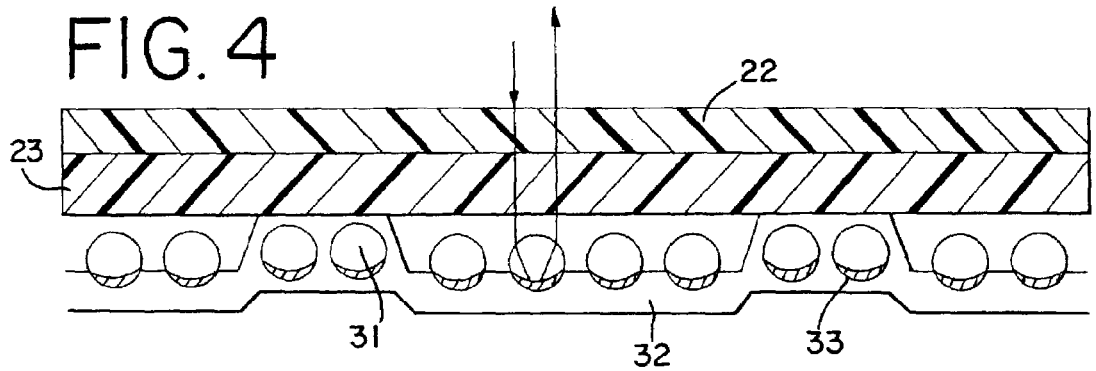
FIG. 4
FIG. 5
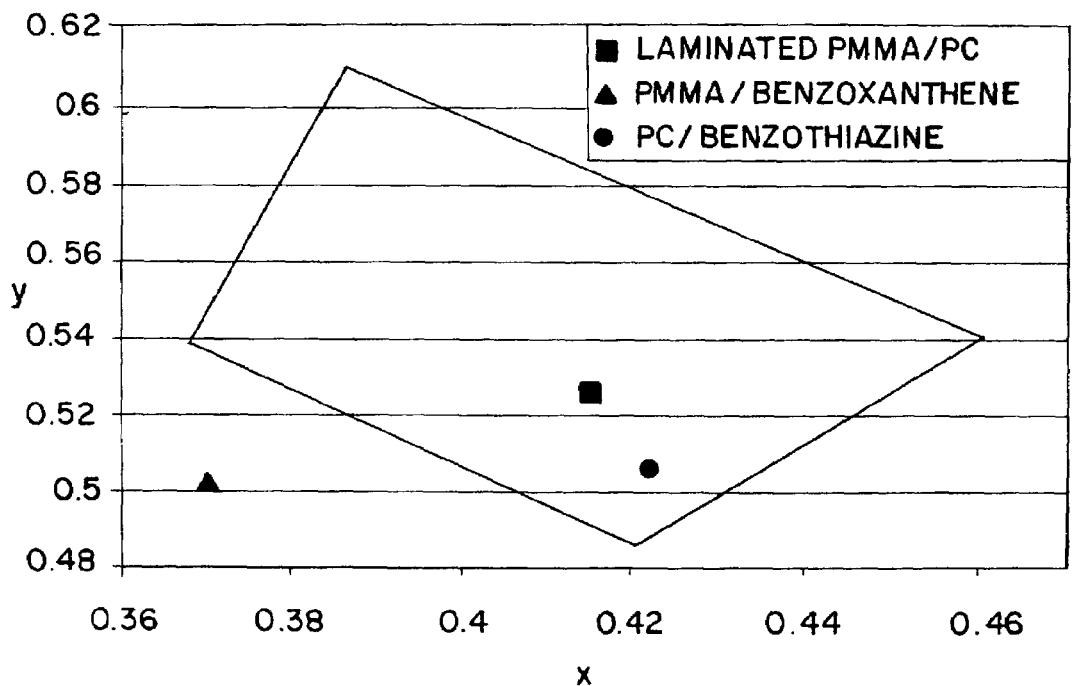

WAVELENGTH (NANOMETERS)

FLUORESCENT ARTICLES HAVING MULTIPLE FILM LAYERS

CROSS-REFERENCES TO RELATED APPLICATION

This is a continuation-in-part of application Ser. No. 10/135,537, filed Apr. 30, 2002, now U.S. Pat. No. 7,264,880 incorporated by reference hereinto.

BACKGROUND OF THE INVENTION

1. Field of the Invention

This invention generally relates to polymers having fluorescent colorants. More particularly, the invention relates to articles having fluorescent properties and being composed of multiple layers, which together provide important properties. Such properties provide desired brightness and chromaticity, which shows excellent resistance to weathering and/or overall color durability.

2. Description of Related Art

Articles incorporating fluorescent dyes into polymeric matrices are extensively known in the art for various applications including signage, vehicle markings, roadway markings, and other applications where high visibility is desired and beneficial for any number of reasons, including safety, information dissemination, visibility, visual signaling, and quick detection. The extraordinarily bright appearance of fluorescent materials is what provides this enhanced visibility, which is especially pronounced at dawn and dusk. In some applications, it is important to meet and maintain certain color standards and/or certain durability standards.

Often these polymer systems containing fluorescent colorants are structured in the form of a sheeting, which exhibits fluorescing properties. Particularly suitable applications for these types of films loaded with fluorescent colorants are in connection with uses where signaling is a primary function of the article. Typically, these take the form of signage, which can benefit by exhibiting fluorescing action. Traffic safety and informational signs have been known to incorporate films having fluorescent colorants, which enhance visibility of the signs. Certain types of signage need to have long-term outdoor durability, which is a big hurdle because most fluorescent colorants have poor ultraviolet light stability. Some of these articles incorporate retroreflective features.

Over the years, the art has developed within the field of retroreflective articles. Generally speaking, there are three main types of retrorefelctive sheetings in the traffic industry, i.e. enclosed lens sheeting, encapsulated lens sheeting, and prismatic sheeting. Palmquist U.S. Pat. No. 2,407,680 illustrates so-called enclosed lens retroreflective sheeting articles. Assemblies of this type are also known as engineering grade, utility grade or super engineering grade products, and they have a typical coefficient of retroreflection at a −4° entrance angle and at a 0.2° observation angle between 50 to 160 cd/lx/m$^2$ for white sheeting, depending upon the specific product.

McKenzie U.S. Pat. No. 3,190,178 generally illustrates so-called encapsulated lens retroreflective articles. This includes sheeting of beads encapsulated into polymer, at times referred to as high intensity products. For white sheeting, these have a typical coefficient of retroreflection of about 300 cd/lx/m$^2$.

A third general category of retroreflective sheeting incorporates microprismatic optical elements which provide exceptional reflectivity, typically between about 400 and about 1600 cd/lx/m$^2$ depending upon the specific product construction and geometry of the cube corner elements. Cube corner retroreflective sheetings are described in Rowland U.S. Pat. No. 3,684,348, Hoopman U.S. Pat. No. 4,588,258, Burns U.S. Pat. No. 5,605,761, and White U.S. Pat. No. 6,110,566. Publications such as Rowland U.S. Pat. No. 3,810,804, and Pricone U.S. Pat. No. 4,601,861 and U.S. Pat. No. 4,486,363 illustrate the manufacture of articles of this type. It will be noted that the art includes retroreflective sheeting by which thermoplastics are embossed into prismatic sheeting. The present invention finds application in products having these principal types of retroreflective construction.

There is also art that teaches how to enhance the UV light durability of retroreflective sheeting which incorporates fluorescent colorants. Some of this art teaches the use of an ultraviolet (UV) light screening layer over or in front of a fluorescent layer. This art includes Japanese Patent Publication No. 2-16042 (Application No. 63-165914) of Koshiji, Phillips PCT Publication No. WO99/48961 and No. WO00/47407, and Pavelka U.S. Pat. No. 5,387,458. The Japanese Publication indicates that UV additives are useful to protect fluorescent sheeting. The PCT publications relate to fluorescent polyvinyl chloride (PVC) film with a UV light screening layer having UV additives, which screen 425 nanometers (nm) and lower. This U.S. Pat. No. 5,387,458 incorporates a UV screening layer for a film of selected polymers containing selected fluorescent dyes.

The art also recognizes other methods of enhancing the durability of fluorescent colors by using stabilizers of the hindered amine light stabilizer type (HALS type). Art in this area includes Burns U.S. Pat. No. 5,605,761 and White U.S. Pat. No. 6,110,566. The former proposes the combination of particular fluorescent dyes and HALS in a polycarbonate matrix. The latter proposes low molecular weight HALS and a thioxanthene dye within a solventless PVC resin.

All of these patents, other art and patent publications, and any others identified herein, are incorporated by reference hereinto.

To a certain extent, art of this type recognizes that making retroreflective signs fluorescent provides enhanced visibility under most lighting conditions. The characteristic bright color and/or the fluorescing characteristics of fluorescent materials attract ones eye to the fluorescent signage or other article. For example, outdoor signage articles, which are colored with fluorescent colorants, enhance visual contrast, making the materials more conspicuous than non-fluorescent colors. When such signage is intended for outdoor uses, two major hurdles are encountered. One is durability under outdoor conditions, and the other is the availability of specific colors.

Unfortunately, most fluorescent colorants have poor UV light stability. When exposed to sunlight or other sources of UV light, fluorescent colorants can fade very quickly. This especially creates problems for traffic and roadway signing applications because the rapid fading of the fluorescent color can dramatically shorten the life of the sign. Although some fluorescent colorants have better UV light stability than others, even the best fluorescent colorants available on the market are not suitable for the extended outdoor durability requirements of a traffic signing application when used alone in a polymeric matrix layer to create a fluorescent retroreflective film. To extend the durability of such films, additional steps must be taken to protect the fluorescent colorants.

A common practice directed toward enhancing outdoor durability is using a UV screening layer such as that taught by the art noted above in an attempt to protect the base fluorescent polymeric matrix layer. Traditionally, such a UV light screening layer is made by dissolving UV light absorbing compounds into a transparent polymeric matrix. The art discloses fluorescent articles consisting of a UV light screening layer deposited in front of a fluorescent color layer. The UV screening layer is intended to absorb a defined range of UV light. UV light has a wavelength range of from 290 nm to 380 nm. Certain art also suggests screening some portion of light in the visible range, such as up to about 400 nm or 410 nm. Often, approaches such as these fail to consider and/or address potential interaction between the UV absorber in the screening layer and the fluorescent dye within the underlying colored layer.

While UV screening is intended to address the outdoor durability problem, several difficulties can arise. One concern is that the UV light absorbing compounds of these screening layers can leach out with time or can diffuse or migrate into the underlying fluorescent layer. This diffusion can actually accelerate fading of the fluorescent colorant in certain instances.

Art such as Burns U.S. Pat. No. 5,605,761 and White U.S. Pat. No. 6,110,566 propose fluorescent sheeting articles of these patents which do not necessarily incorporate a separate UV screening layer. Typically, these teach particular combinations of polymers and fluorescent dyes, often together with HALS materials, in the same film. In particular, the former patent discloses fluorescent articles comprising fluorescent dye and HALS within a polycarbonate matrix. The latter patent purports to teach that the combination of a fluorescent thioxanthene dye and a HALS material in a solventless PVC matrix enhances light stability of the fluorescent colors in the PVC system.

It is also known in the art that certain polymeric matrixes are more suitable as a host for fluorescent dyes with respect to UV light durability of the resulting article. However, acrylic polymers, such as polymethylmethacrylate (PMMA), are generally not known in the art to be a suitable polymeric matrix for fluorescent colors where outdoor light durability is required. For example, Pavelka U.S. Pat. No. 5,387,458 discloses fluorescent articles comprising fluorescent dyes dispersed in various polymeric matrices. This teaches that fluorescent durability of fluorescent dyes in PMMA is poor even with a UV screening overlayer. Burns U.S. Pat. No. 5,605,761 discloses fluorescent articles comprising specific fluorescent dyes and a HALS compound in both polycarbonate and PMMA. This patent teaches incorporation of the HALS compound into the polycarbonate matrix significantly increases the fluorescent durability of the resulting articles, but does not have the same effect with PMMA. Art references such as these conclude that PMMA is not a suitable polymer matrix for fluorescent dyes because such acrylic based articles do not exhibit good fluorescence durability when exposed to extended outdoor weathering.

The conclusion that acrylic is not a suitable host for fluorescent colors is unfortunate because acrylic polymers have advantages over polymers such as polycarbonate. Compared to other polymers such as polycarbonate, such acrylics are inexpensive, easier to process due to a relatively low glass-transition temperature, and typically exhibit better UV light stability. For example, after a few years of outdoor exposure, polycarbonate can exhibit chalking and cracking and can develop a hazy and/or yellow appearance. Acrylics, however, can withstand such outdoor weathering for a significantly longer time before the development of such defects. The primary downside to utilizing acrylic polymers, however, is that acrylics tend to be more brittle than other polymers, such as polycarbonate.

At the present state of the art, although fluorescent acrylic articles appear to hold some promise, issues concerning color stabilization and/or fluorescent stabilization against ultraviolet and visible light radiation present a problem of substantial proportions. Ideally, if a solution could be found, the processing and cost saving benefits of utilizing an acrylic polymer can be realized. Additionally, since acrylic materials will naturally weather better than other polymers, such a solution is potentially all the more important and valuable because an additional UV-light protective cap would not be necessary.

Turning now to the problem of providing articles, which comply with coloration standards, requirements, or needs, coloration considerations present a formidable challenge to suppliers of fluorescent articles, especially those articles that also must be very durable. This is the case whether addressing governmental coloration regulations or other industry standards.

In this regard, it is suggested here that there are three basic approaches for obtaining a desired fluorescent color in the typical instance when a given loading of available fluorescent dyes does not achieve the target fluorescent coloration. One approach is to adjust the loading quantity of the colorant. Often this solution is simply not adequate because the hue of the resulting article will not substantially change.

A second approach is to blend multiple fluorescent dyes together. Such an approach can raise serious compatibility issues, both between the dyes themselves and between one or both of the dyes and the polymer matrix within which they would be loaded. Different dyes have different compatibility with different polymers due to differences between or among their chemical structures. Thus, the UV light durability of a given fluorescent colorant will be different in different polymer matrices. Even if the desired fluorescent color is obtained by blending multiple fluorescent dyes together into a single polymeric matrix, the desired light durability may not be achieved if one of the fluorescent dyes fades more quickly than the other fluorescent dyes in the polymeric matrix. Similarly, one fluorescent dye may have unfavorable interactions with another dye within a polymer matrix. Even if UV light stability can be achieved in a given polymeric matrix when the fluorescent dyes are used alone, the compatibility issues between the dyes can cause the resulting article to have poor UV light stability when these same dyes are blended together into the same polymeric matrix.

It should be noted that art such as Burns U.S. Pat. No. 5,672,643, U.S. Pat. No. 5,674,622, U.S. Pat. No. 5,754,337 and U.S. Pat. No. 5,920,429 suggest making fluorescent yellow articles by blending orange-shade or red-shade perylene imide dyes with a yellow green fluorescent dyes. However, the resulting durability of such articles is not discussed.

The third possible approach is for the polymer matrix to contain a blend of a non-fluorescent dye with a fluorescent dye. The issues noted above for multiple fluorescent dyes in the same polymer matrix are raised for this option as well. The issues could be even more difficult due to the typical greater chemical difference between a fluorescent dye and a non-fluorescent dye. Additionally, there is a chance that the non-fluorescent dye may interfere with the fluorescent properties of the fluorescent dye, which may dramatically reduce brightness of the sheeting. A non-fluorescent dye can quench the overall fluorescing of the fluorescent dye.

Accordingly, the current state of the art also is in need of a solution to this coloration problem. Typically, the provider of such articles does not have the ability to solve this coloration problem by dictating coloration standards to the end user of the fluorescent article. Instead, the end user typically dictates coloration to the manufacturer of such articles, and dye color availability is limited by dye suppliers. For example, governmental agencies, which would be the eventual end user of fluorescent highway road signs, will often define the color and/or durability standards for such signs.

It will be appreciated that attempting to address the two basic problems of light durability and coloration compliance within the same article increases the difficulties of these problems. Yet, a viable solution to these problems is all that more valuable when the same article successfully addresses both types of problems.

SUMMARY OF THE INVENTION

In accordance with the present invention, articles are provided which achieve fluorescent coloration which can be manipulated to realize target coloration needs while at the same time having enhanced fluorescence color light stability and resistance to chalking and hazing after prolonged outdoor exposure. The invention uses a multi-layer approach. At least two layers, such as films, are provided, one on top of the other. Each includes a dye or pigment. In many applications, multiple layers will each contain a fluorescent dye. One of the layers exhibits superior fluorescence color stability. Preferably this is a layer that overlies another layer. When viewed from the environment, the coloration exhibited by the combined dyed layers provides coloration parameters needed to meet a target coloration dictated by a given standard.

A general object of the present invention is to provide products or articles, which are color stable and achieve desired coloration, as well as a method for preparing such products or articles.

An aspect of the present invention is that it provides improved fluorescent coloration articles, which achieve desired coloration values while presenting durability attributes that are extremely well suited for exterior or outdoor usage, including under a variety of weather conditions.

Another aspect of the present invention is that it provides an improved fluorescent colored retroreflective sheeting suitable for use in manufacturing traffic safety and informational signage.

Another aspect of the present invention is that it can provide light-stable fluorescent yellow retroreflective sheeting for traffic warning signs, such as warning chevrons, railroad crossing signs and the like which provide coloration desired for signage of this type.

Another aspect of this invention is that it provides an approach for utilizing weatherable polymers such as acrylic polymer matrices in a fluorescent system which is both light stable and strong enough for extended-time use under harsh environmental conditions such as those encountered by signage in outdoor use.

Another aspect of this invention is that the articles provided are composed of multiple layers which alone are unsuitable, but together are suitable to create a light-durable, properly colored article.

Another aspect of the present invention is the providing of laminated film sheets which exhibit fluorescent coloration for retroreflective sheeting that has suitable durability and coloration when the sheets are combined but not when they are used separately.

Another aspect of the present invention is the providing of laminated film sheets, which provide fluorescent yellow coloration for retroreflective sheeting that has suitable durability and coloration when the sheets are combined, but not when they are used separately.

Another aspect of this invention is enhanced fluorescence and color stability of combined film sheets, which are not achieved through selection of a single layer film.

Another aspect of the present invention is its ability to broaden the range of available fluorescent colors without blending dyes.

Another aspect of the invention is incorporating a fluorescent acrylic layer into a product structure to improve productivity during the manufacturing of the article.

Other aspects, objects and advantages of the present invention will be understood from the following description according to preferred embodiments of the present invention, relevant information concerning which is shown in the accompanying drawings.

BRIEF DESCRIPTION OF THE DRAWINGS

In the course of this description, reference will be made to the attached drawings, wherein:

FIG. 3 is a cross-sectional illustration of an enclosed lens retroreflective sheeting material embodiment of the invention where the fluorescent sheeting having multiple film layers is disposed over an enclosed lens structure;

FIG. 4 is a cross-sectional illustration of an encapsulated lens retroreflective sheeting material embodiment of the invention where the fluorescent sheeting having multiple film layers is disposed over an encapsulated lens structure;

FIG. 5 is a plot of "x" and "y" color chromaticity values in terms of the CIE 1931 Standard Colorimetric System for film structures with respect to target fluorescent yellow-green values;

DESCRIPTION OF THE PREFERRED EMBODIMENTS

Figure 1:
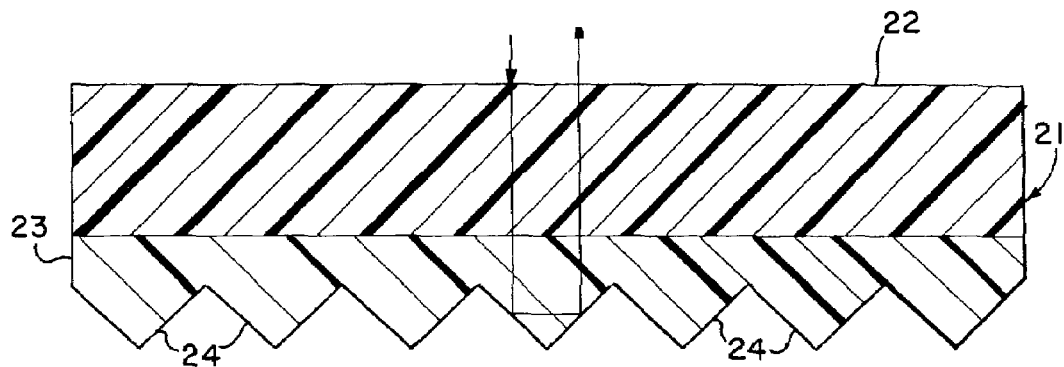
FIG. 1 is a cross-sectional illustration of fluorescent sheeting having multiple colored film layers showing an overlayer containing a fluorescent dye and an underlayer having a colorant and microprismatic retroreflective elements formed thereinto.

The present invention is directed toward fluorescent sheeting having multiple film layers, which provide superior light stability and target fluorescent coloration parameters. Various embodiments of the invention are illustrated in the drawings. In each instance, an overlayer polymer having a fluorescent dye is combined with an underlayer of a polymer matrix having coloration attributes which combine with the overlayer to provide the target coloration and superior fluorescence color stability after prolonged outdoor exposure.

FIG. 1 illustrates multiple layered film sheeting, generally designated as 21. This sheeting material is embodied in retroreflective form. An overlayer 22 and an underlayer 23 are shown. Each layer includes a dye, preferably a fluorescent dye. In this embodiment, the dyed underlayer 23 itself has retroreflective elements.

In other embodiments retroreflective elements such as those shown in this embodiment can be undyed or clear. For example, in FIG. 1A, a retroreflective layer 23a is provided which is made of a clear polymer which is suitable for embossing or forming corner cubes. With this arrangement, the multiple layers of dyed polymer are a separate overlayer 22a and underlayer 22b, neither of which has any reflective elements.

Underlayer 23 or layer 23a has a multiplicity of microprismatic retroreflective elements disposed on the rear surface of this layer. These retroreflective elements are known in the art and are described in such references as Hoopman U.S. Pat. No. 4,588,258 and Appledorn U.S. Pat. No. 4,775,219. This prismatic construction can be manufactured in accordance with Rowland U.S. Pat. No. 3,810,804 and Pricone U.S. Pat. No. 4,486,363 and U.S. Pat. No. 4,601,861, for example. Any suitable process and equipment can be used to form the microprismatic retroreflective elements 24 on the underlayer 23 or layer 23a, or otherwise provide them on this layer.

Figure 1A:
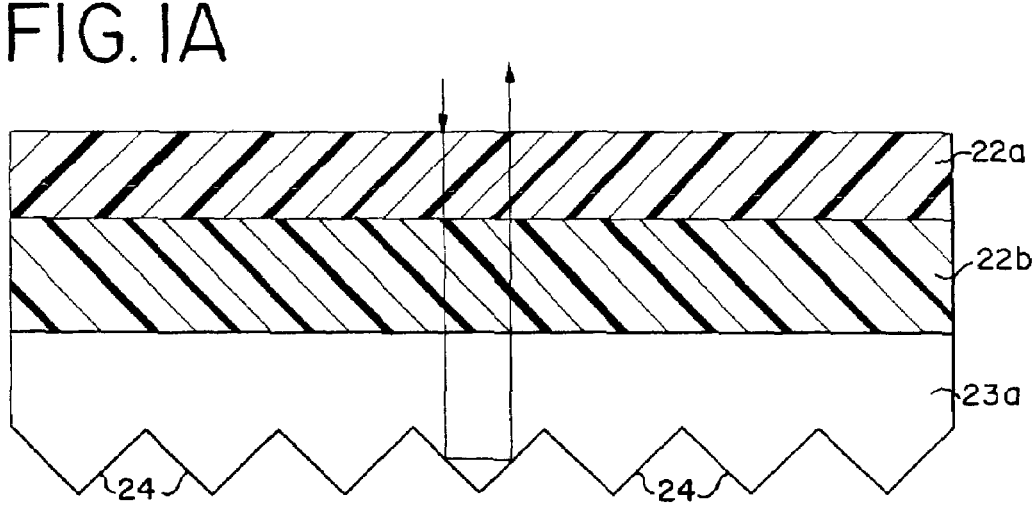
FIG. 1A is a cross-sectional illustration of fluorescent sheeting having multiple colored film layers over clear microprismatic retroreflective elements.

The retroreflective feature provided by the microprismatic elements 24 is illustrated by the arrowed light pattern shown in FIG. 1 and FIG. 1A. For simplicity of illustration, only two dimensions of this three-dimensional reflection are illustrated. This simplified light pattern shows an incident beam reflected twice by the article to provide the parallel reflected beam.

Figure 2:
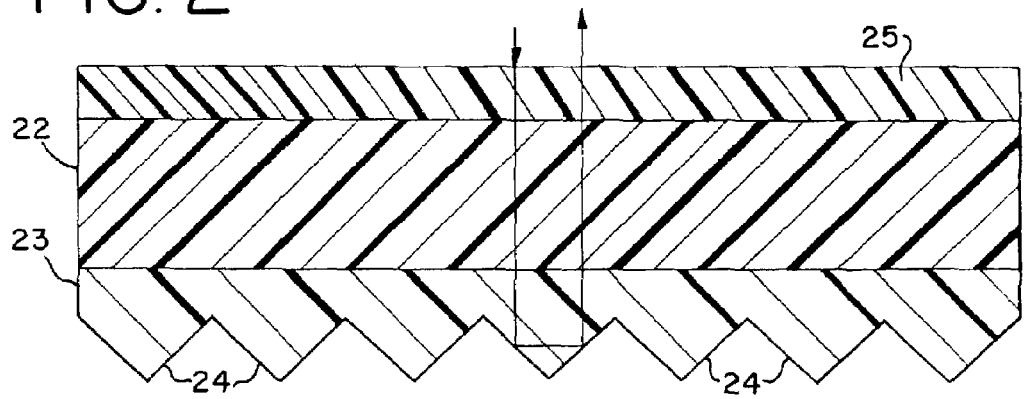
FIG. 2 is a cross-sectional illustration of fluorescent sheeting having multiple film layers and including an external supplemental protective layer.

FIG. 2 shows a similar retroreflective multiple layer film. This embodiment adds a cap or cover layer 25. This is added when there is a need for enhanced UV screening to prevent degradation of the polymer overlayer, such as chalking, hazing, cracking or yellowing of the polymer itself. A suitable cap or cover layer 25 can also enhance the durability of the fluorescent colorants, as well as enhance scratch resistance and graffiti protection. Such a cap or cover layer may be selected to have other properties desirable for the front surface of a sign or the like, such as dew resistance and/or ease of printing.

Typically, the layers are laminated together such as by heat and/or pressure application by conventional equipment. Depending upon the particular needs or desires of the multiple layered film sheeting according to the invention, optional tie layers could be presented between layers. A laminating adhesive could be included to the extent deemed necessary for a particular construction or end use needs. Whenever included, any such tie layer or layers should be selected so as to not significantly detract from the properties to which the multiple layered fluorescent article according to the invention is directed.

A surface of one or more of the layers can be pre-printed with desired indicia so that a finished laminar or multiple-layered structure has the desired indicia on an inner surface, such as disclosed in U.S. Pat. No. 5,213,872 and U.S. Pat No. 5,310,436. Other variations along these lines will be apparent to those skilled in the art of retroreflective sheeting or other alternative structural arrangement of interest for articles according to the invention.

One such other structural arrangement is illustrated in FIG. 3. This illustrates how the present invention can be incorporated into an enclosed lens retroreflective sheeting article. Enclosed lens retroreflective sheeting is well known in the art, an early teaching in this regard being Palmquist U.S. Pat. No. 2,407,680. This technology can incorporate lenses such as glass microspheres embedded in a sheeting structure with a flat, transparent cover film. In the embodiment of FIG. 3, glass microspheres 26 are embedded in underlayer 23. A specularly reflective layer 27 is provided in accordance with known art; for example, this may be vacuum deposited aluminum. The retroreflective nature of this enclosed lens structure is illustrated by the simplified two-dimensional arrowed light beam path which is shown to pass through the overlayer 22, the underlayer 23, into and through the microspheres, into and through the medium 28, and back.

It is also possible to have this overlayer 22 and underlayer 23 laminated together and have an adhesive layer (not shown) which is transparent to join the beads 26 and the underlayer. In this instance, the beads are embedded in the adhesive much as the underlayer 23 embeds the tops of the beads in FIG. 3.

FIG. 4 illustrates how the present invention can be incorporated into an encapsulated lens retroreflective article. The encapsulated lens sheeting retroreflective features and structure are well known in the art. A mono layer of lenses such as glass microspheres is partially embedded in a binder layer, with the films sealed to the binder layer such that the lenses are encapsulated within hermetically sealed cells. In the illustrated embodiment, glass microspheres 31 are embedded in binder layer 32. The underlayer 23 is sealed to the binder layer to hermetically seal the lenses. The illustrated lenses 31 have their own reflective surfaces 33 to provide reflection according to the pattern indicated by the arrowed light path, which is illustrated in FIG. 4.

A fluorescent article according to the invention incorporates multiple polymer matrices. A fluorescent dye is included in one or both of the overlayer and underlayer. Preferably, a fluorescent dye is included in a polymer matrix of overlayer 22 and within the polymer matrix of underlayer 23. In a typical article, the dye in each separate layer is different. This facilitates an important feature of the present invention to provide a multiple layer film, which exhibits the fluorescent color needed for a particular application without having to physically place the dyes in the same polymer matrix.

Matrix polymers can be varied. Examples include polycarbonates, polyesters, polystyrenes, styrene-acrylonitrile copolymers, polyurethanes, polyvinyl chloride, polymers formed from acrylic resins, polyarylates, and copolymers and combinations thereof. The overlayer, underlayer and any cap layer can be of different polymers.

The overlayer is a polymer including polycarbonates, acrylic polymers, polyarylates, and copolymers and combinations thereof. In a preferred aspect of the invention, the overlayer polymer is formed from a polycarbonate, found to provide superior fluorescence color stability. An acrylic resin also is suitable and provides very good weatherability, provided proper selection of the specific acrylic resin and fluorescent dye. The underlayer need not impart superior fluorescence color stability to the laminate and can be of a type in need of protection from weathering in harsh environments. Preferred underlayer polymers include an acrylic polymer, polystyrene and polyvinyl chloride. An acrylic polymer is especially preferred as the underlayer when microprism elements will be formed into that underlayer as shown in FIG. 1.

Polymers including polyarylates and other matrix types and included components are discussed in greater detail in our pending U.S. patent applications Ser. No. 09/710,510, now U.S. Pat. No. 6,972,147, and Ser. No. 09/710,560, now U.S. Pat. No. 6,514,594, each filed Nov. 9, 2000. These disclosures are incorporated hereinto by reference. Among the polymers disclosed therein are polymer resins comprising one polymer or a mixture of (i) polymers having a polymeric backbone comprising the following repeating moiety A:

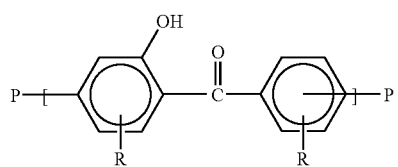

A wherein R is a non-interfering substitutent and P is the remainder of the polymer; and whereby the polymers are able to absorb ultraviolet light; and (ii) polymers having a polymeric back bone comprising the following repeating moiety B:

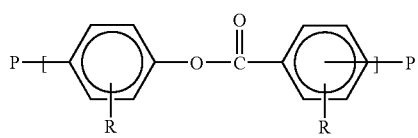

B wherein R is a non-interfering substituent and P is the remainder of the polymer; the moiety B being transformable to to moiety A by photo-pries rearrangement, and whereby the polymer comprising moiety B can be transformed to an ultraviolet light absorbing polymer comprising moiety A.

This polymer resin is a polyarylate and one which may comprise one or both of the following repeating structures I and II:

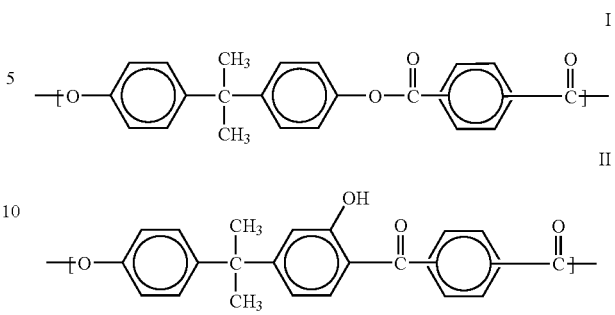

The polymer resins may be a blend of a polyarylate and at least one additional polymer such as a polycarbonate. poly (cyclohexanedimethanol terephthalate), poly(cyclohexanedimethenol-co-ethylene terephthalate), and blends thereof. The overlayer colored fluorescent film may have better fluorescent color stability than the underlayer colored film. The underlayer polymer matrix may have a polymer structure of an acrylic resin, a polystyrene, a polyvinyl chloride, a polyester, a polyarylate, a styrene-acrylonitrile copolymer, a polyurethane, and combinations and copolymers thereof. The overlayer polymer matrix may have a polymer structure of a polycarbonate, an acrylic resin, a polyarylate resin, and combinations and copolymers thereof.

Other, generally known components can be included in either or both the overlayer and underlayer. These are UV absorbers and HALS components. One or more of either or both can be included in any given polymer matrix.

The polymer matrix makes up a substantial percent by weight of the layers. The polymer component ranges between about 90 and about 99.99 weight percent of the formulation making up each polymer matrix, preferably between about 95 and about 99 weight percent. Each dye is present at a level of between about 0.001 and about 1.5 weight percent of the total weight of each matrix formulation, preferably between about 0.002 and about 1.0 weight percent. When present, a UV absorber is provided at levels between about 0.1 and about 5 weight percent, preferably between about 0.3 and about 3 weight percent, based upon the total weight of the polymer matrix formulation. When a HALS component is present, it will be at between about 0.1 and about 2 weight percent, preferably between about 0.3 and about 1.5 weight percent, based upon the total weight of the formulation making up each polymer matrix.

When an acrylic matrix is to be provided, it is generally preferred that the acrylic resin be formulated to minimize the amounts of performance enhancers such as impact modifiers or internal lubricants and the like. When such additives are present, extra attention must be paid to potential negative interactions when selecting the fluorescent dye. It also is believed to be useful if the amount of acrylic monomer present were minimized. Without being bound by any particular theory, it is believed at the present time that such performance enhancers or residual monomers can negatively impact a fluorescent colorant in an acrylic matrix, thereby potentially accelerating fluorescence degradation upon exposure to light, primarily UV-light. It is presently believed that this effect is heightened when combined with moisture, thermal cycling and ultraviolet radiation. Polymethyl methacrylate is a preferred acrylic resin. A particular acrylic resin, which responds to these objectives, is sold under the trade designation "ZKV-001E" from Cyro Industries. Other resins exist, such as Atoglass PSR-9, available from Atofina.

Preferably, coloration is provided in each of the overlayer and underlayer by a fluorescent dye. Dyes in this regard include benzoxanthenes, benzothiazines, perylene imides, thioxanthenes, thioindigoids, naphthalimides and coumarins. Combining films with dyes having different coloration properties has been found to be useful according to the invention in order to create an article of a fluorescent color, which can be tailored to meet certain real or perceived industry needs.

To create a fluorescent yellow laminate, dyes of the benzothiazine type and of the benzoxanthene type have been found to be particularly suitable for inclusion within the overlayer component according to the present invention. Particularly preferred dyes for the overlayer are fluorescent yellow-green dyes. Included are those available under the trade names "Huron Yellow" and "Lumofast Yellow" from DayGlo Color Corporation. Included are "Huron Yellow D-417" and "Luumofast Yellow D-150." Multiple versions may exist. When included within the polymer matrix of an overlayer according to the invention, such a dye gives excellent daytime luminance. It can be used in a range of about 0.02 to about 1.5 weight percent, preferably in the range of about 0.03 and about 1.3 weight percent, based upon the total weight of the matrix formulation. The weight loading of the fluorescent dye will depend upon the thickness of the sheet and the desired color intensity for a particular end use. For example, retroreflective articles generally require that this fluorescent dye should be of sufficient transparency such that the retroreflective function of the article is not significantly impaired.

Another class of dyes that find particular application in the present articles are perylene imide dyes. It has been found that very useful fluorescent coloration and chromaticity is provided within the context of the multiple layered articles when using perylene imide dyes available from BASF under the "Lumogen" tradename. Examples include "Lumogen F Orange 240" and "Lumogen F Red 300". The combination of such dyes in the underlayer and a benzothiazine or a benzoxanthene yellow-green dye in the overlayer results in coloration and chromaticity values which fall well within industry standards for fluorescent yellow sheeting.

Other examples of dyes for the underlayer can include other fluorescent orange and/or red colorations. An orange thioxanthene dye is Marigold Orange D-315, available from DayGlo Color Corporation. Colors other than fluorescent yellow can be achieved with different coloration accommodations. For example, yellow green can be achieved with benzoxanthene "Lumofast Yellow D-150" from Day Glo in the overlayer and "Huron Yellow D-417" form Day Glo benzothiazine dye in the underlayer. Another dye is "Lumogen F Yellow 170" of BASF. Fluorescent blue and green dyes also can be utilized.

It is believed that the inclusion of the UV absorbers in the layers can delay or prevent degradation of the fluorescent dye component. Particularly, it is believed that suitable benzotriazoles, benzophenones, and oxalanilides are UV absorbers, which may delay fading of fluorescent dyes and enhance fluorescent durability.

Benzotriazole UV absorbers are valuable within fluorescent colored polycarbonate matrix systems, particularly in the overlayer of the present multiple layered articles. UV absorbers showing good compatibility with benzothiazine dyes are useful when such dyes are incorporated within a polymer matrix layer. Examples of available benzotriazole UV light absorbers include 2-(2H-benzotriazol-2-y1)-4,6-bis (1-methyl-1-henylethyl)phenol, sold under the trade name "Tinuvin 234" by Ciba-Geigy; and 2-(4,6-diphenyl-1,3,5-triazine-2-yl)-5(hexyl)oxyphenol sold commercially by Ciba-Geigy as "Tinuvin 1577".

Examples of commercially available benzophenone UV light absorbers include 2-hydroxy-4-n-octoxybenzophenone commercially available from Great Lakes Chemical Corporation under the trade name "Lowilite 22", 2,2-dihydroxy-4, 4-dimethoxybenzophenone available under the trade name "Uvinul 3049" from BASF; and 2,2',2,4'-tetrahydroxybenzophenone available under the trade name "Uvinul 3050" from BASF. It has been found that these benzophenone types of UV absorbers are particularly useful for a fluorescent colored acrylic matrix.

An example of an oxalanilide UV absorber is 2-ethyl,2'-ethoxy-oxalanilide sold under the trade name "Sanduvor VSU" by Clariant. Other oxalanilide UV absorbers are available. Individuals skilled in the art will recognize that many other UV light absorbers exist and may be suitable for use in the present invention.

In general, hindered amine light stabilizers (HALS) have been found to be useful to delay fading of fluorescent dyes. Oligomeric or polymeric HALS compounds having molecular weights of about 1500 and greater provide enhanced fluorescence durability. A combination of UV absorber and HALS compound generally helps to further prevent color fading and enhances color durability. Particularly suitable HALS compounds are oligomeric hindered amine compounds from Great Lakes Chemical under the trade name "Lowilite 62", or "Tinuvin 622" available from Ciba-Geigy.

HALS compounds include: dimethyl succinate polymer with 4-hydroxy-2,2,6,6-tetramethyl-1-piperidineethanol commercially available from Ciba Specialty Additives as "Tinuvin 622"; poly[[6-[(1,1,3,3,-tetramethyl butyl)amino]-s-triazine-2,4-diyl][[(2,2,6,6,-tetramethyl-4-piperidyl) imino]hexamethylene [(2,2,6,6-tetramethyl-4-piperidyl) imino]] commercially available from Ciba Specialty Additives under the trade name Chimassorb 944; "Tinuvin 791" which is available from Ciba Specialty Additives and is a blend of poly[[6-1,1,3,3,-tetramethylbutyl)amino]-s-triazine-2,4-diyl][[(2,2,6,6,-tetramethyl-4-piperidyl)imino]hexamethylene[(2,2,6,6-tetramethyl-4-piperidyl)]imino]] and bis(2,2,6,6-tetramethyl-4-piperidynyl)sebacate; and "Hostavin N30" available from Clariant. Those skilled in the art will recognize that many other hindered amine light stabilizers exist and may be suitable for use in the present invention.

When provided, the cover or cap layer provides UV screening to prevent polymeric degradation of polycarbonate when such comprises the overlayer. This includes retarding chalking, hazing, cracking or yellowing dullness of the polycarbonate itself. The cover or cap layer also can further enhance fluorescence durability of the articles by providing an ultraviolet light-screening layer having an ultraviolet light absorbing compound or compounds incorporated into this layer. Alternatively, the cap or cover layer can include a polymer which is itself an absorber of ultraviolet light. A polyarylate matrix is suitable in this regard as referenced hereinabove.

Figure 7:
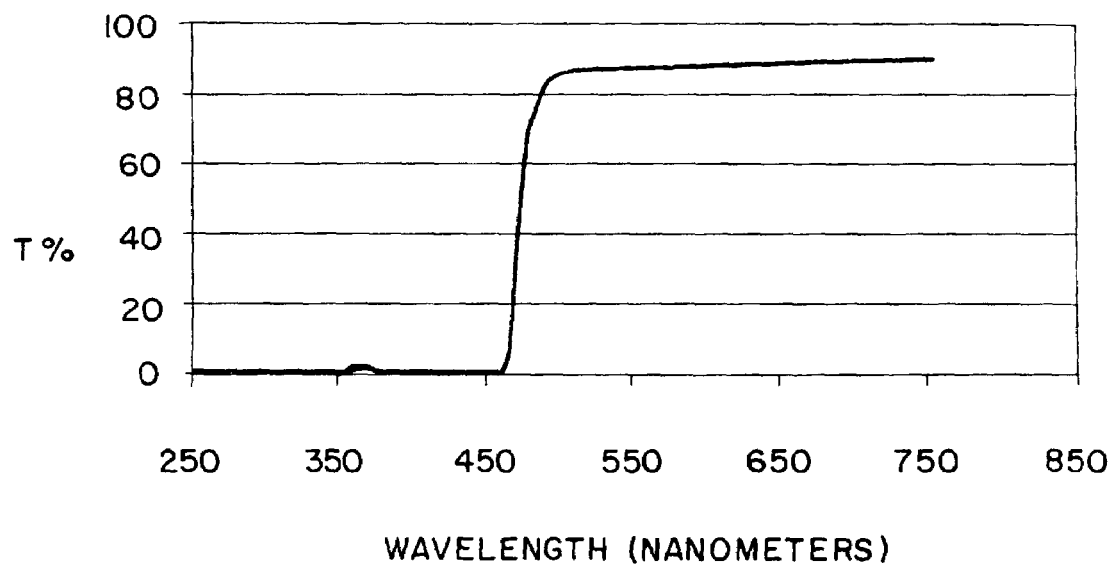
FIG. 7 is a light transmission curve of fluorescent yellow-green acrylic illustrating the light blocking effect of a film component according to the invention.
Figure 17:
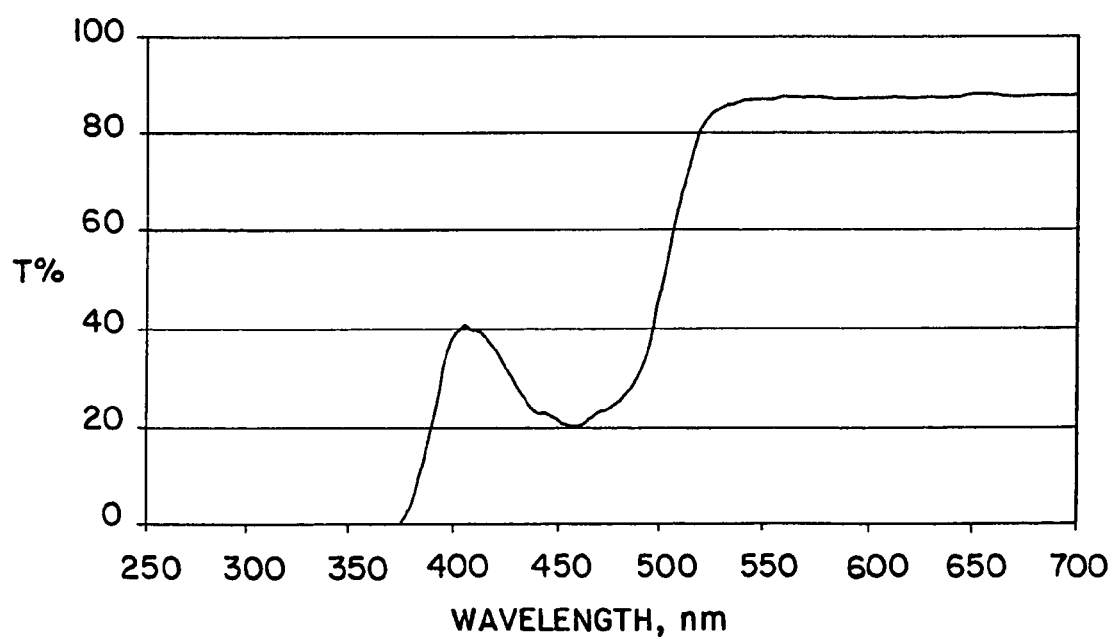
FIG. 17 is a light transmission curve of fluorescent yellow-green polycarbonate illustrating the light blocking effect of a film component according to the invention.

The invention provides durable fluorescent articles with desired colors. In the preferred arrangement, two differently colored fluorescent films create one durable fluorescent article. Each such film contains a fluorescent dye and can contain optional UV additives within a polymer matrix. The overlayer is a colored fluorescent film having superior fluorescence color stability, and the underlayer is a colored fluorescent film of any satisfactory type. When joined together, they achieve the desired fluorescent color. Each color alone need not provide the required fluorescent coloration. One of the reasons that the fluorescent stability of the underlayer need not be as strong as that of the overlayer is that the fluorescent color film of the overlayer itself acts to screen harmful UV light and significant amount of visible light as shown in FIG. 7 and FIG. 17.

With the respective dyes within separate polymer matrices, any negative interaction which otherwise would be expected due to blending two dyes together is eliminated. The combination of the overlayer and underlayer according to the invention provides a superior light stable fluorescent article with a color, such as fluorescent yellow, which can be tailored to vary from fluorescent colors available from dye manufactures. Each single film alone cannot achieve these properties.

When a fluorescent yellow retroreflective sheeting is required for particular uses, such as for extremely visible highway or warning signs, a preferred embodiment combines two layers, neither of which would be suitable by itself to provide this type of signage. In this preferred arrangement, the overlayer is a polycarbonate or an acrylic matrix having a benzothiazine or a benzoxanthene dye, and the underlayer is an acrylic matrix having a perylene imide dye. When assembled as a single article, a highly durable and properly colored signage article with needed chromaticity is provided.

One of the advantages of utilizing polycarbonate as the overlayer for a fluorescent yellow laminate is that it improves the overall impact resistance of the article when acrylic is used as the underlayer. Acrylic polymers are typically brittle polymers with little impact resistance. On the other hand, polycarbonate polymers are very strong polymers with a high degree of impact resistance. By using polycarbonate as the overlayer, a greater degree of strength and impact resistance is imparted to the resulting fluorescent laminate.

Furthermore, when the present invention is used to create a fluorescent microprismatic sheeting as depicted in FIG. 1, one advantage of using an acrylic polymer as the underlayer is that acrylic polymers have a lower glass-transition temperature than other polymers, such as polycarbonate. Therefore, the microprismatic elements can be more easily formed into the acrylic underlayer.

Thicknesses of the overlayer 22, of the underlayer 23, and of the cap layer 25 (when provided) can vary somewhat depending upon the particular article being prepared. Typically, the overlayer will have a thickness of between about 2 mils and about 20 mils (0.05 mm to 0.5 mm), more typically between about 3 mils and about 10 mils (0.075 mm to 0.25 mm). A typical underlayer will have a thickness of between about 2 mils and about 20 mils (0.05 mm to 0.5 mm), more typically between about 3 mils and about 10 mils (0.075 mm to 0.25 mm). When a cap layer is included, its thickness ranges between about 1 mil and about 10 mils (0.025 mm to 0.25 mm), more typically between about 2 mils and about 5 mils (0.05 mm to 0.125 mm), and typically between about 2 mils and about 4 mils (about 0.05 mm to about 0.100 mm).

The following Examples are provided for purposes of illustration and explanation. The films used in these Examples were made using a laboratory Killion single screw extruder with three heating zones or with the use of a Brabender mixer. In the single screw extruder set up, a mixture of the indicated polymer resins, the indicated dye and other additives such as UV light stabilizer and/or HALS was extruded into a film of about 6 mils (0.15 mm) thick. As an example, for the acrylic matrix film, the temperature zone settings typically at 490° F., 460° F. and 440° F. For polycarbonate film, the temperature zone settings typically were at 530° F., 540° F. and 550° F. The extrusion screw speed was 27 rpm. When the mixer was used, the equipment was a C. W. Brabender Plasti-Corder Prep-Mixer. The material was compounded through melt mixing of polymer resins and other components and then converted into films of approximately 6 mils (0.150 mm) using a heated platen press. Mixing temperatures were in the range of between about 220° C. and about 270° C., depending upon the particular polymer resin, and the mixing speed was 100 rpm for a mixing time of between about 3 and about 6 minutes. The thus prepared different films were laminated together at about 185° C. using a Hot Roll Laminator M from Cheminstruments.

EXAMPLE 1

An overlayer film of a polymethyl methacrylate matrix was prepared by blending an acrylic resin (Acrylite Plus ZK-V-001E, a Cyro trade designation), 0.8 weight percent benzoxanthene fluorescent dye (Lumofast Yellow D-150, a DayGlo trade designation), together with 1.0 weight percent UV absorber (Lowilite 22, a Great Lakes Chemical trade designation), and 0.5 weight percent HALS (Lowilite 62, a Great Lakes Chemical trade designation). This single-layer PMMA was designated Sample 1-1.

A polycarbonate matrix underlayer film was made by blending polycarbonate resin (Calibre 303EP, a Dow Chemical designation) with 0.06 weight percent benzothiazine fluorescent dye (Huron Yellow D-417, a DayGlo trade designation). This single polycarbonate (PC) film was designated as Sample 1-2-1. Sample 1-2-2 was a multiple film laminate of Sample 1-1 on Sample 1-2-1.

Another PC underlayer film was prepared from the same polycarbonate resin as sample 1-2-1, together with 0.05 weight percent Huron Yellow D-417 fluorescent dye, and 1.5 weight percent UV absorber (Tinuvin 1577, a trade designation of Ciba Geigy). This was designated as Sample 1-3-1. Sample 1-3-2 was a multiple layer film of Sample 1-1 laminated on Sample 1-3-1.

A further PC underlayer film was prepared using the same polycarbonate resin, this time combined with 0.05 weight percent Huron Yellow D-417 fluorescent dye, 1 weight percent Tinuvin 1577 UV absorber, and 0.3 weight percent HALS component (Tinuvin 622, a trade designation of Ciba Geigy). This was Sample 1-4-1. Sample 1-4-2 was the Sample 1-1 PMMA film laminated on this Sample 1-4-1 film.

Another PC underlayer film was prepared. This was composed of polycarbonate resin (Calibre-302, a trade designation of Dow Chemical), 0.08 weight percent Huron Yellow D-417, and 0.3 weight percent HALS component (Tinuvin 622). This was Sample 1-5-1 Sample 1-5-2 was a lamination of film Sample 1-1 on film Sample 1-5-1.

Each of the five single films identified above and each of the four two layer laminated films was subjected to accelerated weathering testing. Each sample was placed into a Xenon Arc accelerated "Weather-O-Meter", and the amount of fading was monitored through routine color measurements on a HunterLab LS-6000 calorimeter. The instrument used a D65 light source, 2° observer and a 0/45 geometric configuration, and all color measurements were recorded in terms of the CIE 1931 Standard Colorimetric System. To determine the extent of fading and color shifts, the $\Delta E^*$ degree of color shift versus time of artificial weathering was determined. A small value of the $\Delta E^*$ color shift, such as a shift of about 2 or 3 $\Delta E^*$ units is barely detectible to the human eye. The test methodology used for the Xenon arc weathering is outlined in ASTM G26-90, Section 1.3.1. Borosilicate inner and outer filters were used, and the irradiance level was set to 0.35 W/m$^2$ at 340 nm.

Results were recorded with respect to the CIELAB color difference, measuring $\Delta E^*$. The $\Delta E^*$ values at three different accelerated weathering times, namely 500 hours, 1000 hours and 1500 hours, were determined for certain monolayer and two-layer films. These data are reported in Table I.

TABLE I

| Sample | Film Structure | ΔE* of Samples Exposed at Indicated Period of Time (Hours) | | |
|---|---|---|---|---|
| | | 500 | 1000 | 1500 |
| 1-1 | Single PMMA film | 23.04 | 21.45 | 21.63 |
| 1-2-1 | Single PC film | 9.89 | 12.26 | 11.96 |
| 1-2-2 | PMMA/PC two layer | 3.36 | 2.48 | 4.89 |
| 1-3-1 | Single PC film | 8.04 | 10.74 | 12.64 |
| 1-3-2 | PMMA/PC two layer | 4.51 | 3.90 | 6.89 |
| 1-4-1 | Single PC film | 5.27 | 8.76 | 5.62 |
| 1-4-2 | PMMA/PC two layer | 5.03 | 4.05 | 7.84 |
| 1-5-1 | Single PC film | 4.54 | 11.48 | 11.47 |
| 1-5-2 | PMMA/PC two layer | 2.77 | 3.00 | 3.99 |

Figure 8:
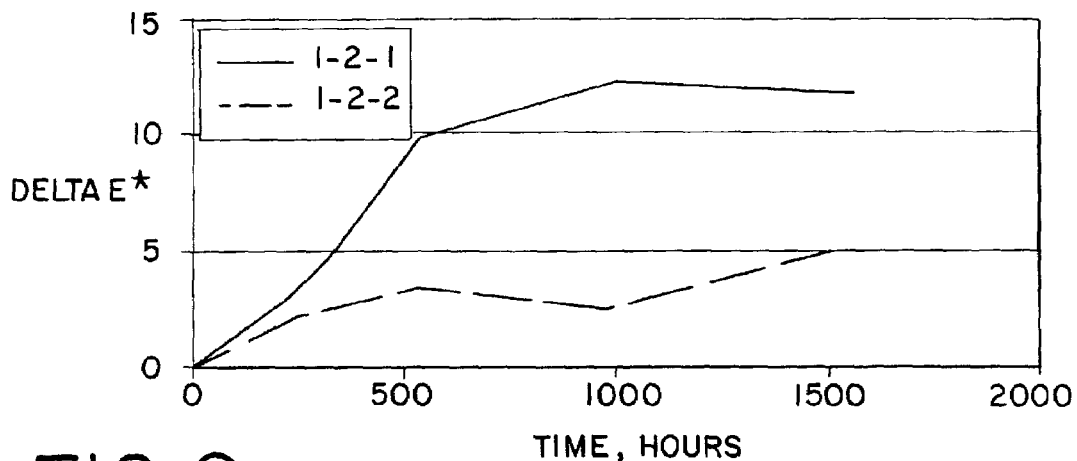
FIG. 8 is a plot of degree of color shift versus time of accelerated or artificial weathering, illustrating different exposure effects for a particular film and for that film having a fluorescent polymer matrix overlay.
Figure 9:
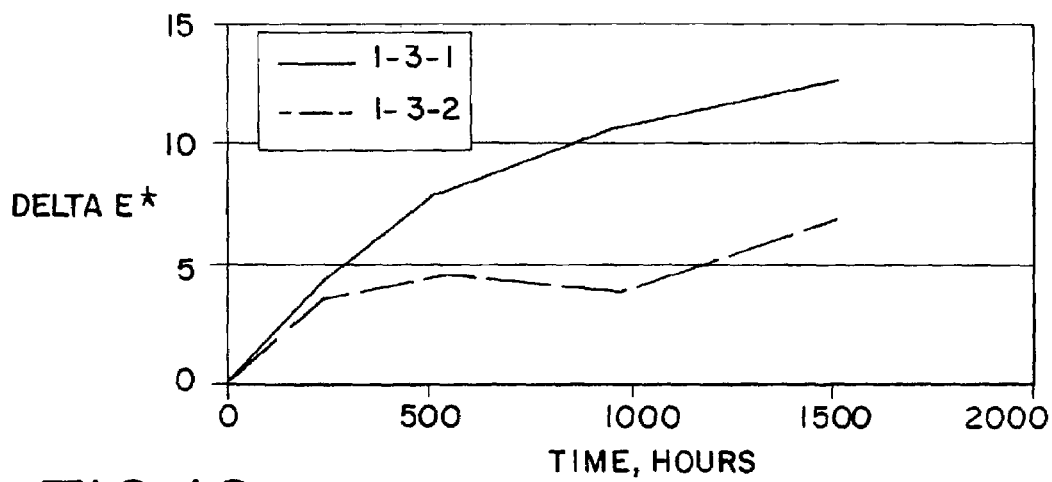
FIG. 9 is a plot of degree of color shift versus time of accelerated or artificial weathering, illustrating different exposure effects for a particular film and for that film having a fluorescent polymer matrix overlay, with the underlying film including a UV absorber.
Figure 10:
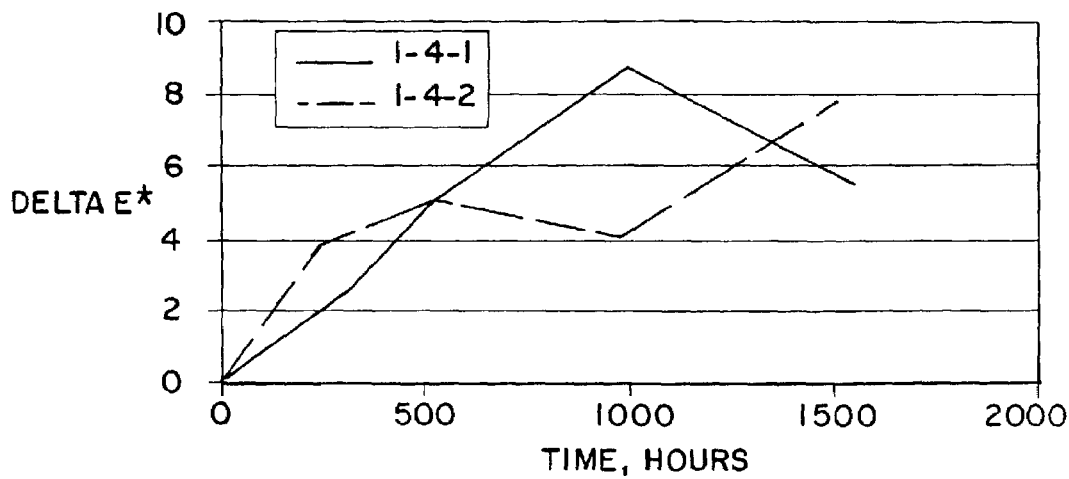
FIG. 10 is a plot of degree of color shift versus time of accelerated or artificial aging, illustrating different exposure effects for a particular film and for that film having a fluorescent polymer matrix overlay, the underlayer including a UV absorber and a HALS component.
Figure 11:
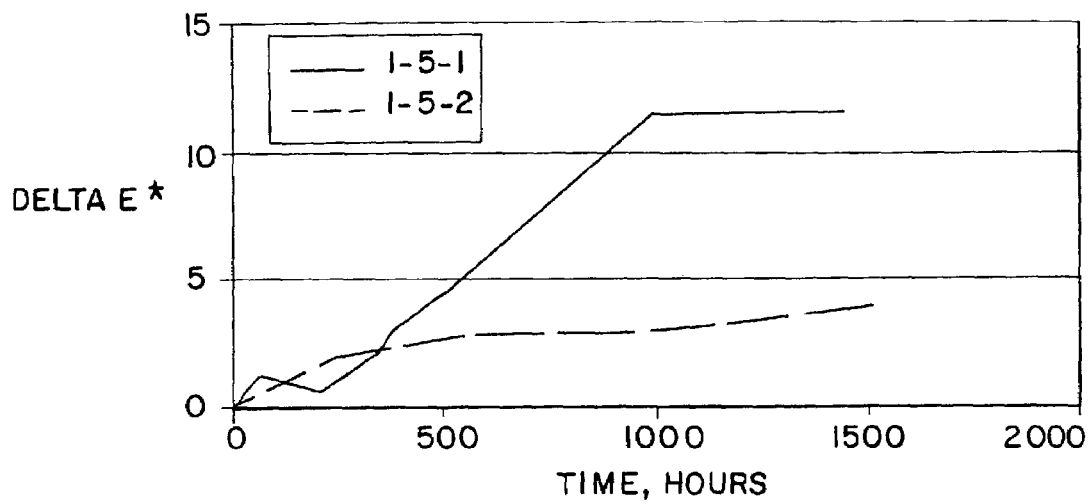
FIG. 11 is a plot of degree of color shift versus time of accelerated or artificial aging illustrating different exposure effects for a particular film and for that film having a fluorescent polymer matrix overlay, the underlayer including a HALS component.

The Table I data show that large color shifts were indicated for the single film components. The two layer films showed improved durability of fluorescent properties when compared with the individual single layer films. This can be seen in FIG. 8, which plots the ΔE* value versus time of accelerated weathering for the single PC film 1-2-1 and for the PMMA/PC two layer film 1-2-2. The same type of plot is provided in FIG. 9 for single PC film 1-3-1 and four two layer PMMA/PC film 1-3-2. FIG. 10 plots the Table I data for single PC film 1-4-1 and for two layer PMMA/PC film 1-4-2. FIG. 11 plots the weathering data for single PC film 1-5-1 and for the two layer PMMA/PC film 1-5-2, the weathering being particularly minimal for this two layer film. These data demonstrate the durability of fluorescence and of color which are substantially enhanced when the multiple film layer approach is used in comparing ΔE* values of the multiple film structure to the single layer film components.

EXAMPLE 2

A single layer polymethyl methacrylate film matrix was prepared by combining an acrylic resin, namely Acrylite Plus ZK-V-001E, a trade designation of Cyro, having incorporated thereinto 0.8 weight percent Lumofast Yellow 3G fluorescent dye from DayGlo. This was designated as Sample 2-1. A single polycarbonate matrix film was prepared from Calibre 303EP pellets of Dow Chemical with 0.05 weight percent Huron Yellow D-417 fluorescent dye and 1.5 weight percent Tinuvin 1577 UV absorber. This was designated as Sample 2-2. Sample 2-3 was a two layer PMMA/PC film of Sample 2-1 laminated on Sample 2-2.

Testing was conducted to determine chromaticity and "Y %" for these three film Samples. These are shown in Table II.

TABLE II

| Sample | Film Structure | "x" | "y" | Y % |
|---|---|---|---|---|
| 2-1 | Single PMMA film | 0.3706 | 0.5034 | 94.15 |
| 2-2 | Single PC film | 0.4220 | 0.5050 | 82.53 |
| 2-3 | PMMA/PC two layer | 0.4152 | 0.5254 | 89.62 |

The CIE "x" and "y" color chromaticity coordinates are useful to compare these films with a color standard used and acknowledged in the art. They can be compared with those of a target fluorescent yellow green, which meet the chromaticity requirements of the industry. These color coordinates for fluorescent yellow green are: (0.387, 0.610), (0.460, 0.540), (0.421, 0.486) and (0.368, 0.539).

FIG. 5 provides a plot of the fluorescent yellow green color box required of the industry, as defined by these "x", "y" color coordinates noted above. Films exhibiting chromaticity coordinates ("x" and "y") within this defined box can be considered to be generally acceptable.

The "Y %" coordinate is in a third dimension, which can be visualized as projecting above the two dimensions of the FIG. 5 two dimensional box. Generally, a larger "Y %" indicates a greater degree of fluorescence and thus greater desirability in the present context. The "Y %" value is a total luminance factor. It is a standard measure of the amount of light (electromagnetic radiant power which is visually detectible by the normal human observer) radiating from a surface weighted by the eye's efficiency to convert the light to luminous sensation. It is defined as the ratio of the total luminance of a specimen to that of a perfect diffuser illuminated and viewed under the same conditions.

From FIG. 5, it is clear that the single PMMA film did not fall within the "x" and "y" coordinates of the fluorescent yellow-green color box, and the single PC film gave borderline within-the-box coordinates. Surprisingly, the 2-layer film made of these two films having unacceptable or marginally acceptable "x" and "y" coordinates provided a two layer film which is much more comfortably within the target "x" and "y" coordinates. It is of interest that the x value is not merely an average of the "x" values of the two films from which it is made. Even more surprising, the "y" value is higher than for either single film, which is critical to maintaining the color inside the required color box during weathering. For example, in the case of the single PC film, a small color shift upon weathering will put the color of this film outside of the required color box.

Concerning the "Y %" parameter, the two-layer film provides a fluorescent yellow green shading with favorable values. It is noted that the "Y %" of the two-layer film is greater than the average of the two "Y %" values for the individual films.

EXAMPLE 3

The films of Example 2 were converted into retroreflective road sign sheeting through the use of a well-known embossing technique to provide a structure as generally shown in FIG. 1. For this embossing process, a plurality of microprismatic corner cube elements were formed directly into the rear surface of the fluorescent film. Then, a finished retroreflective sheeting was made by bonding a white backing film to the embossed film in a repeating cellular pattern. The color coordinates ("x", "y") and luminance factor ("Y %") values of the finished retroreflective sheeting are shown in Table III. For comparison purposes, the "x", "y" and "Y %" values of commercial fluorescent yellow green products also are shown. Especially interesting in this regard is the "Y %" value for the two-color layer PMMA/PC product. Its "Y %" is higher than either color film which it contains, and it is closer to the commercial products than to the individual films.

TABLE III

| Retroreflective Sheeting Type | "x" | "y" | Y % |
|---|---|---|---|
| Avery Dennison T-7513 Fluorescent Yellow-Green | 0.4076 | 0.5641 | 92.94 |
| 3M 3983 Fluorescent Yellow Green | 0.4069 | 0.5704 | 95.28 |
| PMMA single color film | 0.3404 | 0.5260 | 85.95 |
| PC single color film | 0.4302 | 0.5417 | 83.9 |
| PMMA/PC two color layer | 0.4067 | 0.5433 | 89.75 |

Figure 6:
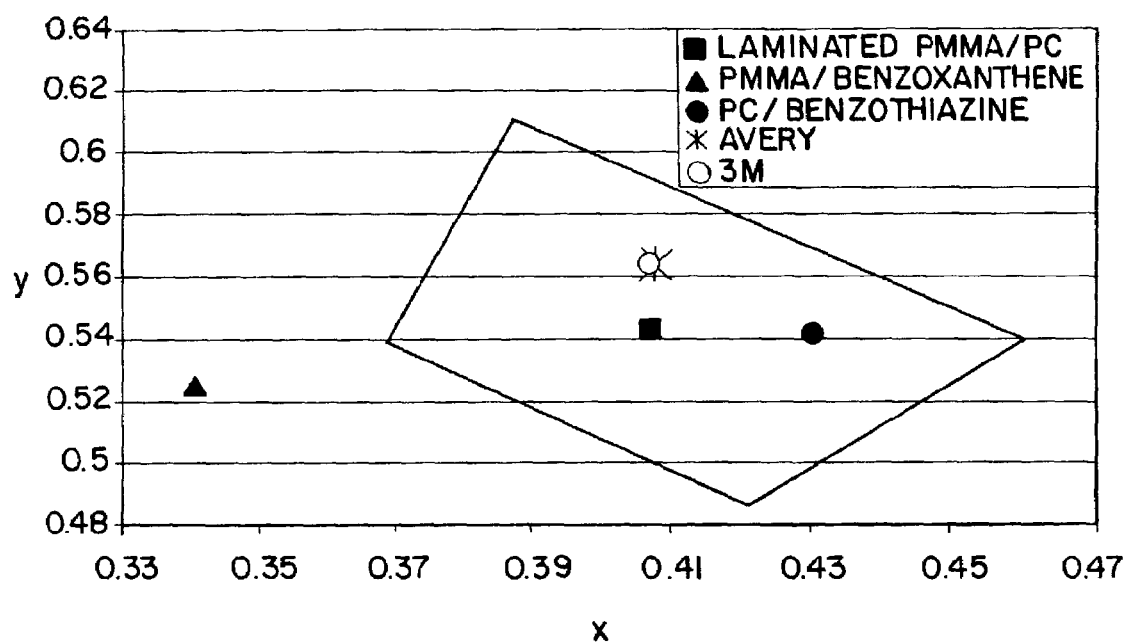
FIG. 6 is a plot of "x" and "y" color chromaticity values in terms of the CIE 1931 Standard Colorimetric System for retroreflective sheeting types with respect to an overlay of target fluorescent yellow-green values.

The "x" and "y" values of Table III are plotted in FIG. 6 and in association with the same industry standard fluorescent yellow green color box of FIG. 5. The coordinates for the non-comparison products are somewhat different in FIG. 6 than those for the same films in FIG. 5. This illustrates an expected shifting between the coordinates displayed by raw films and by those converted into retroreflective road sign sheeting. As can be noted from TABLE III and from FIG. 6, the two color layer product according to the invention has chromaticity and "Y %" values which are close to those of existing products, which can be considered to be standards to attempt to achieve in this type of product. Neither of the single layer products from which the two layer product is made would be suitable by itself to achieve a fluorescent yellow green retroreflective sheeting with the desired color and "Y %" coordinates. The chromaticity of retroreflective sheetings made from either of these single fluorescent yellow green PMMA layers or PC layers is far away from those of the existing products which provide the desired target for this article.

EXAMPLE 4

Two single layer films were prepared with the same fluorescent dye, namely 0.06 weight percent Huron Yellow D-417. One of the polymer matrices was a polycarbonate, Calibre 303-EP, while the other polymer was an acrylic matrix made from Cyro Acrylite Plus ZK-V-001E. The colored polymethyl methacrylate showed excessive fading after only 200 hours of accelerated weathering, the $\Delta E^*$ being 36.70, indicating that the light stability of the fluorescent dye in the host acrylic matrix was very poor. Contrary to this result, the same benzothiazine dye showed much better light stability in the polycarbonate resin, indicating that it is a suitable host for this fluorescent dye. At 200 hours of accelerated aging, the $\Delta E^*$ was only 2.55. At 500 hours, it was 9.89, and at 1000 hours, the $\Delta E^*$ was 12.26 for the polycarbonate film.

EXAMPLE 5

A polymethyl methacrylate film of 6 mils thickness was prepared. It contained 0.8 weight percent of Lumofast Yellow D150 dye, 1.0 weight percent of Lowilite 22 UV absorber, and 0.5 weight percent Lowilite 62 HALS component. Light transmission data were recorded. They are plotted in FIG. 7 as a light transmission curve. It is noted that almost all of the light below 460 nm was blocked by the film due to the presence of the dye and the UV absorber. This Example indicates that the fluorescent yellow green PMMA film is a strong light screener for other fluorescent colored films, illustrating its effectiveness as an overlayer in accordance with the invention.

EXAMPLE 6

A fluorescent yellow green overlayer film was prepared with the same formulation as Sample 1-1 in Example 1. This polymethyl methacrylate film was designated as Sample 4-1. A fluorescent orange PMMA underlayer film was made by blending acrylic resin pellets (Atohaas VO-45, a trade designation of Atohaas) with an orange fluorescent thioxanthene dye, namely 0.25 weight percent of Marigold Orange D-315, a trade designation of DayGlo, 1 weight percent Tinuvin 234 UV absorber and 0.5 weight percent Tinuvin T-144 UV absorber. This was designated as Sample 4-2-1. A two-layer article was prepared by laminating Sample 4-1 film on a Sample 4-2-1 film. This was designated as sample 4-2-2.

Another fluorescent orange underlayer film was prepared in a PMMA matrix. The acrylic resin was Plexiglas PSR-9, a trade designation of Atofina, with perylene imide fluorescent dyes from BASF, namely 0.2 weight percent Lumogen F Orange 240 and 0.025 weight percent Lumogen F Red 300. This was designated as Sample 4-3-1. A two-layer film was prepared by laminating the Sample 4-1 overlayer on the Sample 4-3-1 underlayer. This was designated as a Sample 4-3-2.

Each of the three single layer films and both of the two layer articles were subjected to accelerated aging generally in accordance with Example 1. The results are reported in Table IV.

TABLE IV

| Sample | Film Structure | $\Delta E^*$ of Samples Exposed at Indicated Period of Time (Hours) | | |
|---|---|---|---|---|
| | | 500 | 1000 | 1500 |
| 4-1 | Single PMMA FYG Film | 23.04 | 21.45 | 21.63 |
| 4-2-1 | Single VO-45 FO Film | 25.4 | 31.32 | 36.94 |
| 4-2-2 | PMMA FYG/VO-45 FO two layer | 10.06 | 22.33 | 24.38 |
| 4-3-1 | Single PSR-9 FO Film | 5.79 | 11.82 | 25.75 |
| 4-3-2 | PMMA FYG/PSR-9 FO two layer | 3.23 | 2.51 | 6.71 |

Figure 12:
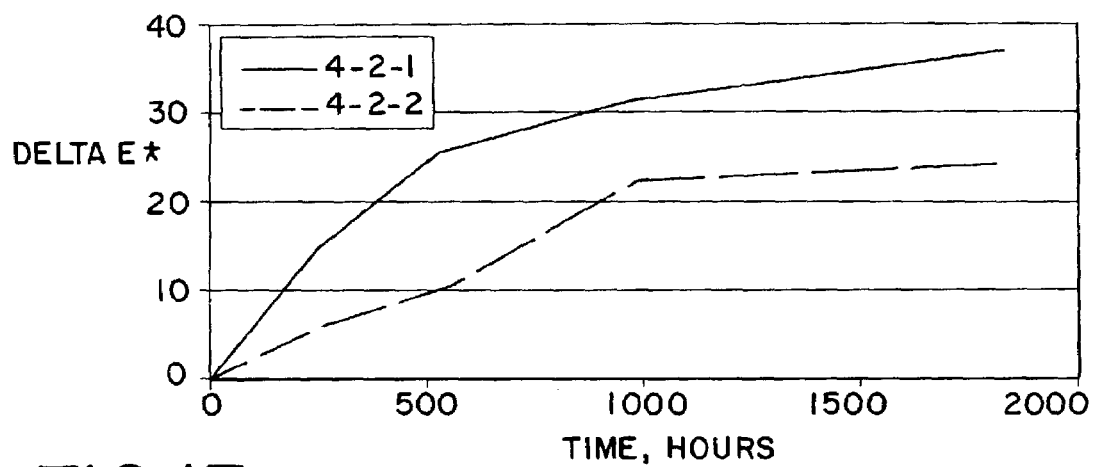
FIG. 12 plots degree of color shift versus time of accelerated or artificial aging for a single-layer yellow-green fluorescent acrylic film, as well as for sheeting having this film as an overlayer onto a polymer matrix containing orange dye.
Figure 13:
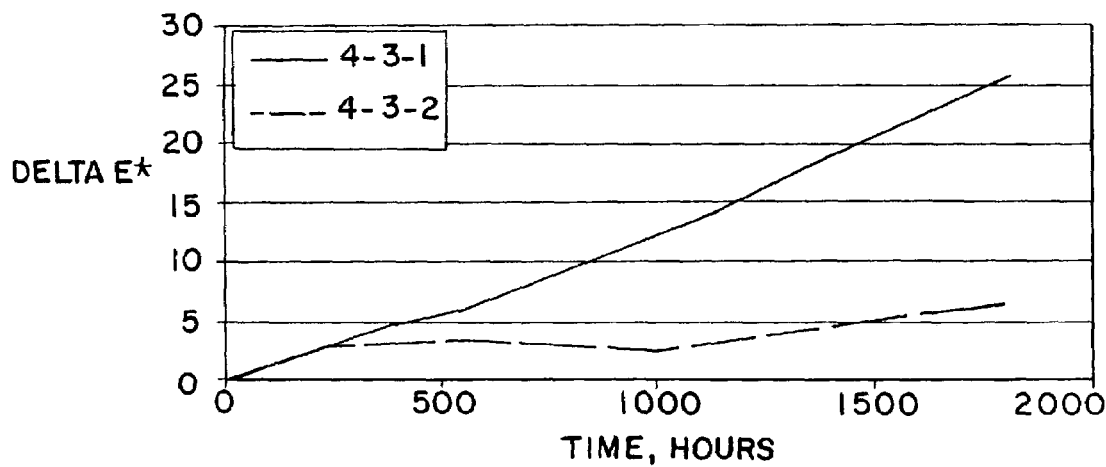
FIG. 13 plots degree of color shift versus time of accelerated or artificial aging for a single-layer yellow-green fluorescent acrylic film, as well as for sheeting having this film as an overlayer onto a polymer matrix containing an orange dye different from that of FIG. 12.

The $\Delta E^*$ generated from this Xenon Arc weathering test of the single layer PMMA FYG film gave substantially consistent poor results. Single layer Sample 4-2-1 was consistently poor, and single layer Sample 4-3-1 did not withstand extended time weathering. However, both two-layer articles gave better results, Sample 4-3-2 being particularly effective. FIG. 12 plots the Table IV results for the two samples containing the VO-45 FO film. FIG. 13 plots these results for the PSR-9 FO film containing articles.

EXAMPLE 7

Accelerated weathering results using QUV accelerated weathering was performed on two different two-layer film structures. QUV is an accelerated weathering tester in which polymer samples are exposed under UV light. The light lamps used in the test emanated 340 nm light. The conditions used were based on ASTM G 53-88.

One of the film structures was a PMMA/PC two layer article, namely Sample 1-3-2 from Example 1. The other was Sample 4-3-2 from Example 6, a PMMA FYG/PSR-9 FO two layer article. The weathering results were very good. Sample 1-3-2 gave a $\Delta E^*$ reading of 0.83 at 200 hours of accelerated exposure time, a $\Delta E^*$ reading of 1.63 at 1500 hours, and a $\Delta E^*$ reading of 3.23 at 3000 hours. For the Sample 4-3-2 article, the $\Delta E^*$ reading at 200 hours was 1.27. At 1500 hours, the $\Delta E^*$ reading was 3.8, and at 3000 hours, the $\Delta E^*$ reading was 3.56. All of these indicate excellent light exposure durability.

EXAMPLE 8

A fluorescent yellow sheeting having multiple film layers is prepared. The overlayer is an acrylic matrix made from Acrylite Plus ZK-V-001E from Cyro, 0.8 weight percent of Lumofast Yellow D150 from DayGlo, 1 weight percent UV absorber, and 0.5 weight percent HALS component. The underlayer is an acrylic matrix made from Acrylite Plus Exp-140 from Cyro and 0.3 weight percent Lumogen F Orange 240 (a perylene dye from BASF). UV absorbers, if desired, are added, selected from Lowilite 22, Tinuvin 234, and Tinuvin P. A HALS component, selected from Lowilite 62 and Tinuvin 770, also maybe added as needed.

EXAMPLE 9

Another fluorescent yellow sheeting having multiple film layers is prepared. The overlayer is an acrylic matrix made from Acrylite Plus EXP-140 from Cyro, and 0.16 weight percent Lumogen F Orange 240 from BASF. The underlayer is an acrylic matrix made from Acrylite Plus EXP-140 and 0.3 weight percent Lumogen F Yellow from BASF. UV absorbers, if desired, are added, selected from Tinuvin 234, Tinuvin P, Uvinul 3049, and Lowilite 22. A HALS component, typically Lowilite 22, Tinuvin 770, and Tinuvin 622, also may be added as needed.

EXAMPLE 10

A fluorescent yellow green sheeting having multiple film layers is prepared. The overlayer is a polymer blend matrix containing polyarylate made from U-Polymer U-6000 from Unitika, Japan, and 0.8 weight percent Lumofast Yellow 3G from Day-Glo. No UV additive is needed. The underlayer is a polycarbonate matrix made from polycarbonate and 0.05% Huron Yellow D 417. No UV additive is needed.

EXAMPLE 11

A fluorescent yellow green overlayer film of a polycarbonate matrix was prepared by blending polycarbonate pellets (Makrolon 3108, a Bayer trade designation), 0.09 weight percent benzothiazine fluorescent dye (Huron Yellow D-417, a DayGlo trade designation), together with 1.5 weight percent benzotriazole UV light absorber (Tinuvin 1577, Ciba Geigy trade designation). This single-layer PC was designated Sample 5-1.

A fluorescent orange polymethyl methacrylate underlayer film was made by blending acrylic resin (PSR-9, an Autofina trade designation) with 0.175 weight percent perylene imide fluorescent dye (Lumogen F Orange 240, a BASF trade designation). This single PMMA film was designated as Sample 5-2-1. Sample 5-2-2 was a multiple film laminate of Sample 5-1 on Sample 5-2-1.

Another fluorescent orange PMMA underlayer film was prepared from the same acrylic resin as sample 5-2-1, together with 0.136 weight percent Lumogen F Orange 240 fluorescent dye, and 0.0025 weight percent Lumogen F Red 300 (a perylene imide dye trade designation of BASF). This was designated as Sample 5-3-1. Sample 5-3-2 was a multiple layer film of Sample 5-1 laminated on Sample 5-3-1.

Testing was conducted to determine chromaticity and "Y %" for these five film Samples. These are shown in Table V.

TABLE V

| Sample | Film Structure | "x" | "y" | Y % |
| --- | --- | --- | --- | --- |
| 5-1 | Single FYG PC film | 0.4352 | 0.5205 | 87.17 |
| 5-2-1 | Single FO acrylic film | 0.4806 | 0.4183 | 71.80 |
| 5-2-2 | Laminated film of samples 5-1 and 5-2-1 | 0.5118 | 0.4685 | 64.35 |
| 5-3-1 | Single FO acrylic film | 0.4822 | 0.4096 | 69.52 |
| 5-3-2 | Laminated film of samples 5-1 and 5-3-1 | 0.5165 | 0.4689 | 63.73 |

The CIE "x" and "y" color chromaticity coordinates are useful to compare these films with a color standard used and acknowledged in the art. They can be compared with those of a target fluorescent yellow which meet the chromaticity requirements of the industry. These color coordinates for fluorescent yellow are: (0.479, 0.520), (0.446, 0.483), (0.512, 0.421) and (0.557, 0.442). Color specification limitations are defined in the July 2002 Final Rule Making of the FHWA, as published in the Federal Register at Vol. 67, No. 147, at 49569.

Figure 14:
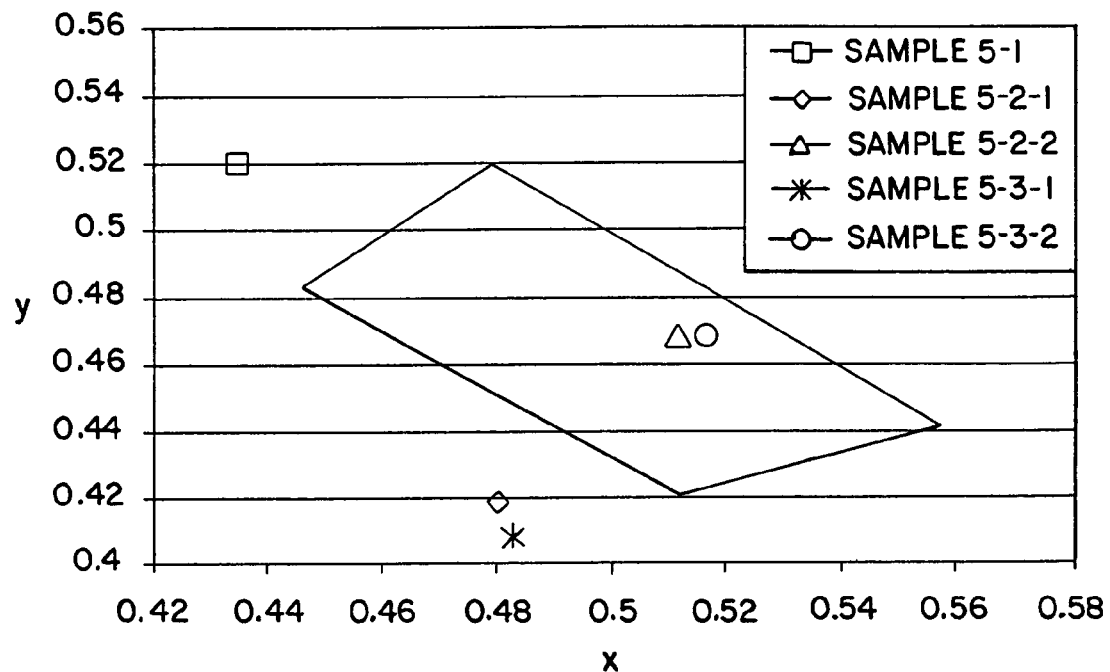
FIG. 14 is a plot of "x" and "y" color chromaticity values for films with respect to target fluorescent yellow values.

FIG. 14 provides a plot of the fluorescent yellow color box required of the industry, as defined by these "x" and "y" color coordinates noted above. Films exhibiting chromaticity coordinates ("x" and "y") within this defined box can be considered to be generally acceptable.

The "Y %" coordinate is in a third dimension, which can be visualized as projecting above the two dimensions of the FIG. 14 two dimensional box. Generally, a larger "Y %" indicates a greater degree of fluorescence and thus greater desirability in the present context. The "Y %" value is a total luminance factor as described hereinabove.

From FIG. 14, it is clear that the single PC film and the single acrylic films did not fall within the "x" and "y" coordinates of the fluorescent yellow color box. This plot also clearly illustrates that the desirable fluorescent yellow color was achieved by the two combinations of fluorescent yellow green film and fluorescent orange or orange/red film. Surprisingly, both of the two-layer films made of these single films having unacceptable "x" and "y" coordinates provided two layer films which are comfortably within the target "x" and "y" coordinates. It is of interest that the "x" value for each clearly is not merely an average of the "x" values of the two films from which it is made.

EXAMPLE 12

A single layer yellow green polymethyl methacrylate film matrix was prepared by combining an acrylic resin, namely PSR-9 resin pellets, having incorporated thereinto 0.6 weight percent Lumofast Yellow D-150, a benzoxanthene fluorescent dye from DayGlo. This was designated as Sample 6-1. Another PMMA matrix film, this one a fluorescent orange acrylic film, was prepared from PSR-9 with 0.123 weight percent Lumogen F Orange 240 and 0.005 weight percent Lumogen F Red 300 perylene imide dyes. This was designated as Sample 6-2. Sample 6-3 was a two layer PMMA/PMMA film of Sample 6-1 laminated on Sample 6-2.

Testing was conducted to determine chromaticity and "Y %" for these three film Samples. These are shown in Table VI and are plotted in FIG. 15.

TABLE VI

| | | Chromaticity Coordinates | | |
| --- | --- | --- | --- | --- |
| Sample | Film Structure | "x" | "y" | Y % |
| 6-1 | Single FYG acrylic film | 0.3625 | 0.4926 | 92.15 |
| 6-2 | Single FO acrylic film | 0.4855 | 0.4044 | 66.53 |
| 6-3 | Laminated film of Samples 2-1 and 2-2 | 0.4951 | 0.4557 | 65.55 |

The CIE "x" and "y" color chromaticity coordinates are used to compare these films with the color standard noted in Example 12. It is clear from these data that each of the two single PMMA films did not fall within the coordinates of the fluorescent yellow color box, whereas the two-film combination of these PMMA films did fall clearly within these coordinates. Surprisingly, the PMMA/PMMA film "x" value is not merely an average of the "x" values of its individual films.

EXAMPLE 13

The two-layer films of Example 11 and of Example 12 were converted into retroreflective road sign sheeting through the use of a well-known embossing technique to provide a structure as generally shown in FIG. 1. For this embossing process, a plurality of microprismatic corner cube elements were formed directly into the rear surface of the underlayer film. Then, a finished retroreflective sheeting was made by bonding a white backing film to the embossed film in a repeating cellular pattern.

Figure 16:
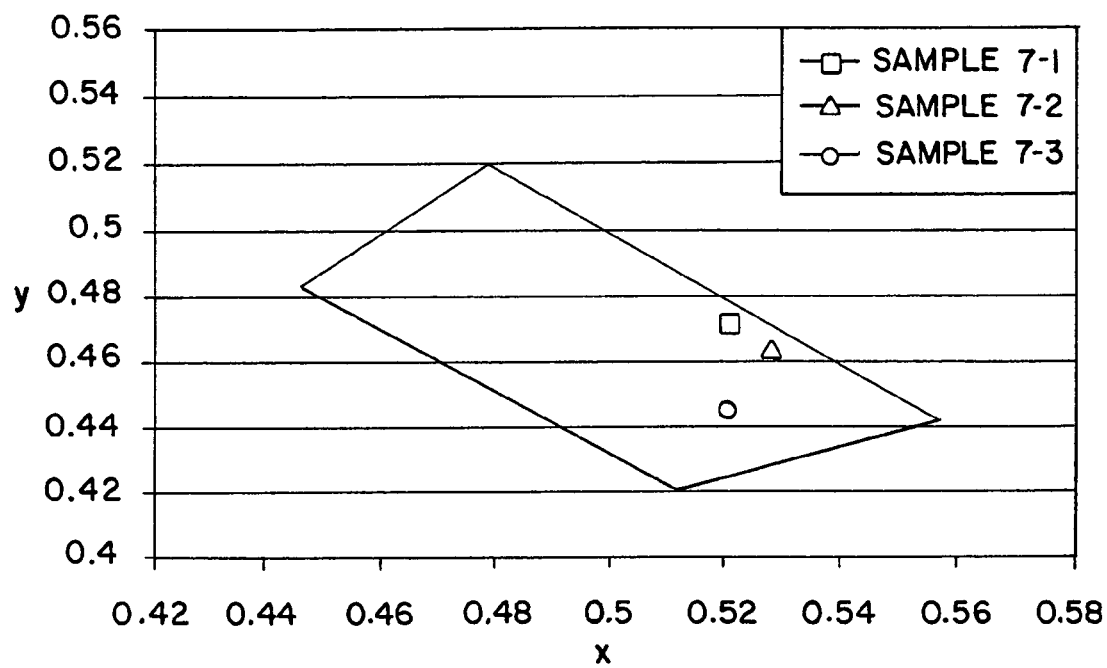
FIG. 16 is a plot of "x" and "y" color chromaticity values for retroreflective films with respect to target fluorescent yellow values.

The color coordinates ("x", "y") and luminance factor ("Y %") values of the finished retroreflective sheeting are shown in Table VII and are plotted in FIG. 16. Sample 7-1 is this retroreflective sheeting made from the sample 5-2-2 PC/PMMA film. Sample 7-2 is made from the sample 5-3-2 PC/PMMA film. Sample 7-3 is made from the sample PMMA/PMMA film.

TABLE VII

| Sample | Retroreflective Sheeting Type | "x" | "y" | Y % |
|---|---|---|---|---|
| 7-1 | Finished retroreflective sheeting based on Sample 5-2-2 film | 0.5206 | 0.4718 | 76.28 |
| 7-2 | Finished retroreflective sheeting based on Sample 5-3-2 film | 0.5280 | 0.4644 | 76.29 |
| 7-3 | Finished retroreflective sheeting based on Sample 5-3 film | 0.5205 | 0.4454 | 73.00 |

Figure 15:
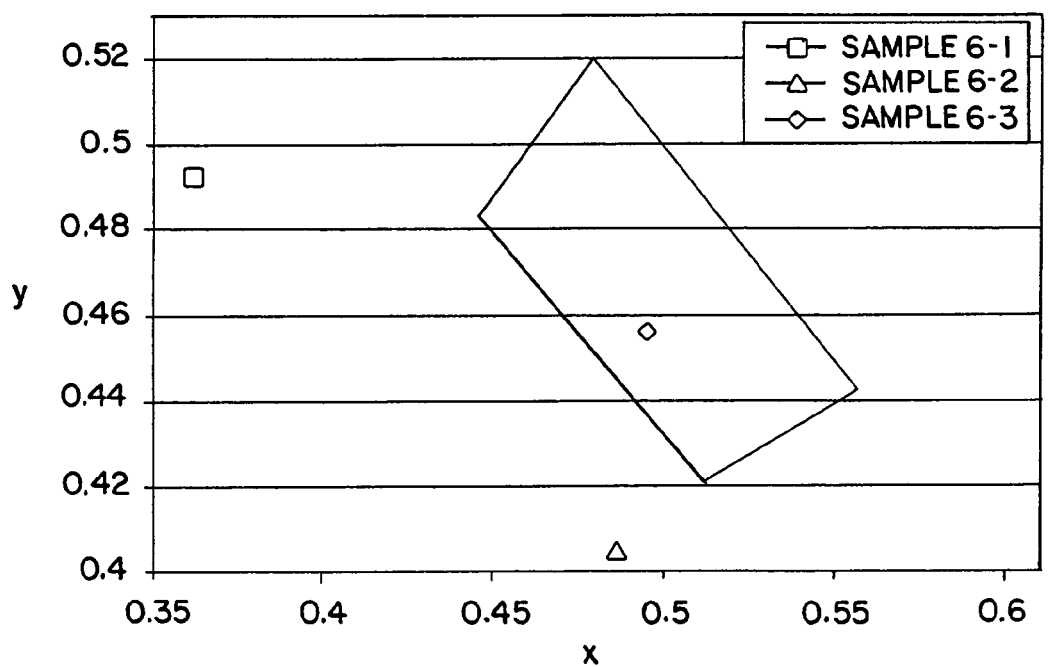
FIG. 15 is a plot of "x" and "y" color chromaticity values for films with respect to target fluorescent yellow values.

The "x" and "y" values of Table VII are plotted in FIG. 16 and in association with the same industry standard fluorescent yellow color box of FIG. 14 and FIG. 15. The coordinates clearly show that the retroreflective sheeting with desirable fluorescent yellow color have been achieved by each of the two layered retroreflective films of this Example.

EXAMPLE 14

This Example demonstrates the durability of the fluorescent yellow retroreflective sheeting made according to Example 13 where the overlayer is fluorescent yellow green polycarbonate. The underlayer was a fluorescent orange acrylic film. Sample 8-1 is retroreflective sheeting Sample 7-2 with a cap layer added over the fluorescent yellow-green polycarbonate. The cap layer used in this Example was an acrylic 3 mil film available from Mitsubishi Rayon Corp. under the trade name "HBL-002".

The Sample 8-1 was subjected to accelerated weathering. It was placed into a xenon arc accelerated "weather-o-meter" and the amount of fading was monitored through routine color measurements on a HunterLab LS-6000 calorimeter, 0/45 configuration. The results were recorded with respect to the CIELAB color difference measuring $\Delta E^*$, comparing the initial color reading taken prior to accelerated weathering and the color reading at certain weathering time. The reported $\Delta E^*$ is a conventional measure of color change. The smaller the $\Delta E^*$, the less the color change, and the greater the durability. The results of this accelerated aging testing are reported in Table VIII. The weathering results in Table VIII show that the resultant fluorescent retroreflective sheeting has very good durability.

TABLE VIII

| | | $\Delta E^*$ of Sample Exposed at Indicated Period of Time (Hours) | | |
|---|---|---|---|---|
| Sample | Film Structure | 500 | 1000 | 1500 |
| 8-1 | HBL 002/PC/PMMA | 4.26 | 4.07 | 6.94 |

EXAMPLE 15

A polycarbonate film was prepared. It contained fluorescent yellow green dye. Light transmission data were recorded. They are plotted in FIG. 17 as a light transmission curve. It is noted that the fluorescent yellow green dye absorbs light up to 510 nm. Thus, this screens the UV light (defined by the range of 280 nm to 380 nm) and much visible light (defined by the range of 380 nm to 780 nm). This Example illustrates that the fluorescent yellow green overlayer film is a strong light screener for other fluorescent colored films, including those within the underlayer, thereby illustrating its effectiveness as an overlayer in accordance with the invention. This also indicates that the advantageous additional screening feature of this type of overlayer permits the incorporation into the underlayer many fluorescent dyes which otherwise would be relatively unstable from a color durability perspective.

It will be understood that the embodiments of the present invention which have been described, are illustrative of some of the applications of the principles of the present invention. Numerous modifications may be made by those skilled in the art without departing from the true spirit and scope of the invention.

The invention claimed is:

1. A retroreflective sheeting article comprising:
an underlayer colored fluorescent film comprising at least one fluorescent dye within an underlayer polymer matrix;
an overlayer colored fluorescent film having at least one fluorescent dye within an overlayer polymer matrix, said overlayer colored fluorescent film has better fluorescent color stability than said underlayer colored film;
the article has retroreflective members, said overlayer colored fluorescent film being over said underlayer colored fluorescent film;
said at least one fluorescent dye in one said film is different from any fluorescent dye in the other said film, and said overlayer polymer matrix and said underlayer polymer matrix are different from each other, and
said article has a selected fluorescent coloration different from both said underlayer colored fluorescent film and said overlayer colored fluorescent film.

2. The article in accordance with claim 1, wherein said underlayer polymer matrix has a polymer structure selected from the group consisting of an acrylic resin, a polystyrene, a polyvinyl chloride, a polyester, a polyarylate, a styrene-acrylonitrile copolymer, a polyurethane, and combinations and copolymers thereof.

3. The article in accordance with claim 1, wherein said underlayer polymer matrix has a polymer structure selected from the group consisting of an acrylic resin, a polystyrene, and a polyvinyl chloride, and combinations and copolymers thereof.

4. The article in accordance with claim 1, wherein said overlayer polymer matrix has a polymer structure selected from the group consisting of a polycarbonate, an acrylic resin, a polyarylate resin, and combinations and copolymers thereof.

5. The article in accordance with claim 1, wherein said overlayer polymer matrix has a polymer structure selected from the group consisting of a polycarbonate, an acrylic resin, and combinations and copolymers thereof.

6. The article in accordance with claim 1, wherein said overlayer polymer matrix had been formed from a polycarbonate.

7. The article in accordance with claim 1, wherein said selected fluorescent coloration of the article is selected from the group consisting of fluorescent yellow, fluorescent yellow green, fluorescent orange, fluorescent red, fluorescent blue and fluorescent green as provided by dyes selected from the group consisting of benzoxanthenes, benzothiazines, perylenes, perylene imides, pereylene esters, thioxanthenes, thioindigoids, and combinations thereof.

8. The article in accordance with claim 1, wherein said selected fluorescent coloration of the article is fluorescent yellow.

9. The article in accordance with claim 1, wherein said selected fluorescent coloration is fluorescent yellow having "x" and "y" chromaticity coordinates which are bounded by the following "x" and "y" chromaticity coordinates: (x=0.479, y=0.520), (x=0.446, y=0.483), (x=0.512, y=0.421) and (x=0.557, y=0.442).

10. The article in accordance with claim 1, wherein said overlayer colored fluorescent film has UV and visible light screening properties.

11. The article in accordance with claim 1, wherein said overlayer colored fluorescent film substantially blocks light having a wavelength from about 250 nm to about 520 nm.

12. The article in accordance with claim 1, wherein said overlayer colored fluorescent film substantially blocks light having a wavelength of from about 280 nm to about 450 nm.

13. The article in accordance with claim 1, wherein said second fluorescent dye has a greater daytime luminance factor "Y%" than said first dye.

14. The article in accordance with claim 1, wherein said overlayer film is less brittle than said underlayer film, and said article has greater impact resistance than said underlayer.

15. The article in accordance with claim 1, wherein said underlayer is between said overlayer and said retroreflective members such that incident light passes through said overlayer, then passes into said underlayer, then encounters said retroreflective members and retroreflects into said underlayer colored film and passes through said overlayer colored film and out of the article.

16. The article in accordance with claim 15, wherein said retroreflective members are arranged to provide an encapsulated lens retroreflective construction.

17. The article in accordance with claim 15, wherein said retroreflective members are arranged to provide an enclosed lens construction.

18. The article in accordance with claim 1, wherein said retroreflective members are formed into said underlayer.

19. The article in accordance with claim 18, wherein said retroreflective members are microprismatic elements.

20. The article in accordance with claim 1, wherein said article is signage which is suitable for outdoor use for at least three years.

21. The article in accordance with claim 1, further including a cap layer polymeric film overlying said overlayer colored fluorescent film, and wherein said article is signage which is suitable for outdoor use for at least three years, and the overlayer film and underlayer film combine to provide yellow coloration within the box defined by the following "x" and "y" chromaticity coordinates: (x=0.479, y=0.520), (x=0.446, y=0.483), (x=0.512, y=0.421) and (x=0.557, y=0.442).

22. The article in accordance with claim 1, wherein said fluorescent dye of the overlayer is a benzoxanthene dye or a benzothiazine dye.

23. The article in accordance with claim 1, wherein said underlayer polymer matrix is an acrylic resin, the fluorescent dye of said underlayer film comprises at least one perylene imide dye, said overlayer polymer matrix is a polycarbonate resin, and said fluorescent dye of the overlayer comprises at least one benzothiazine dye.

24. The article in accordance with claim 1, further including a cap layer polymeric film overlying said overlayer colored fluorescent film, said cap layer being selected from the group consisting of an acrylic resin, a polyarylate, and combinations thereof.

25. The article in accordance with claim 1, wherein the article has a $\Delta E^*$ value after extended exposure to outdoor conditions which is substantially less than that of either said underlayer film or of said overlayer film.

26. The article in accordance with claim 1, wherein said article is a yellow fluorescent article, said underlayer polymer matrix is an acrylic resin, said first fluorescent dye comprises at least one perylene imide dye, said overlayer polymer matrix is a polycarbonate, and said second fluorescent dye comprises at least one benzothiazine dye.

27. The article in accordance with claim 1, further including a light stabilizer selected from the group consisting of a UV absorber, a HALS component and combinations thereof, said light stabilizer being within either or both of said underlayer and said overlayer.

28. The article in accordance with claim 1, wherein said underlayer colored fluorescent film and overlayer colored fluorescent film each are individually unsuitable to meet UV light durability requirements and coloration compliance standards for outdoor signage having said selected fluorescent coloration, while said article meets said requirements and standards.

29. The article in accordance with claim 1, wherein the coloration of said underlayer colored fluorescent film is different from the coloration of said overlayer colored fluorescent film.

30. An article having fluorescent coloration, comprising:
an underlayer colored fluorescent film having at least one fluorescent dye within an underlayer acrylic resin polymer matrix;
an overlayer colored fluorescent film having at least one fluorescent dye within an overlayer polymer matrix, said overlayer polymer matrix having been formed from a polycarbonate or an acrylic resin;
said overlayer colored fluorescent film overlies said underlayer colored fluorescent film and the article has retroreflective elements; and
said at least one fluorescent dye in one said film is different from any fluorescent dye in the other said film, said overlayer colored fluorescent film and said underlayer colored fluorescent film being different from each other, and the article has a selected fluorescent coloration different from the coloration of either said underlayer colored fluorescent film or said overlayer colored fluorescent film.

31. The article in accordance with claim 30, wherein said selected fluorescent coloration is fluorescent yellow having the following "x" and "y" chromaticity coordinates which are bounded by the following "x" and "y" chromaticity coordinates: (x=0.479, y=0.520), (x=0.446, y=0.483), (x =0.512, y=0.421) and (x=0.557, y=0.442).

32. The article in accordance with claim 30, further including a cap layer film of an acrylic resin, a polyarylate resin, or combinations or copolymers thereon said cap layer providing UV light screening properties, and said cap layer overlies said overlayer.

33. The article in accordance with claim 30, wherein said overlayer film is less brittle than said underlayer film, and said article has greater impact resistance than said underlayer.

34. The article in accordance with claim 30, wherein said underlayer is between said overlayer and said retroreflective elements such that incident light passes through said overlayer, then passes into said underlayer, then encounters said retroreflective elements and retroreflects into said underlayer colored film and passes through said overlayer colored film and out of the article.

35. The article in accordance with claim 34, wherein said retroreflective elements are arranged to provide an encapsulated lens retroreflective construction.

36. The article in accordance with claim 34, wherein said retroreflective elements are arranged to provide an enclosed lens retroreflective construction.

37. The article in accordance with claim 30, wherein said retroreflective elements are formed into said underlayer.

38. The article in accordance with claim 30, wherein said retroreflective elements are prismatic elements.

39. The article in accordance with claim 30, wherein said article is signage which is suitable for outdoor use for at least three years.

40. The article in accordance with claim 30, wherein said article is signage which is suitable for outdoor use for at least three years, and the overlayer film and underlayer film combine to provide yellow coloration within the box defined by following "x" and "y" chromaticity coordinates: (x=0.479, y=0.520), (x=0.446, y=0.483), (x=0.512, y=0.421) and (x=0.557, y=0.442).

41. The article in accordance with claim 30, wherein said fluorescent dye of the overlayer comprises at least one benzoxanthene dye.

42. The article in accordance with claim 30, wherein said fluorescent dye of the overlayer comprises at least one benzothiazine dye.

43. The article in accordance with claim 30, wherein said fluorescent dye of the underlayer comprises at least one perylene imide dye.

44. The article in accordance with claim 30, wherein the coloration of said underlayer colored fluorescent film is different from the coloration of said overlayer colored fluorescent film.

45. A retroreflective article having fluorescent yellow coloration, comprising:
an underlayer fluorescent orange film having at least one fluorescent perylene imide dye within an underlayer acrylic resin polymer matrix;
an overlayer fluorescent yellow-green film having at least one fluorescent benzothiazine dye within an overlayer polymer matrix, said overlayer polymer matrix having been formed from a polycarbonate;
a cap layer film of an acrylic resin;
said overlayer fluorescent yellow-green film overlies said underlayer fluorescent orange film, and said cap layer overlies said overlayer; and
said article has retroreflective elements and has a fluorescent yellow coloration which results from the combination of said fluorescent yellow-green overlayer over said fluorescent orange underlayer.

46. The article in accordance with claim 45, wherein said fluorescent yellow coloration has the following "x" and "y" chromaticity coordinates which are bounded by the following "x" and "y" chromaticity coordinates: (x=0.479, y=0.520), (x=0.446, y=0.483), (x=0.512, y=0.421) and (x=0.557, y=0.442).

47. The article in accordance with claim 45, wherein said overlayer film is less brittle than said underlayer film, and said article has greater impact resistance than said underlayer.

48. The article in accordance with claim 45, wherein said retroreflective elements are microprismatic elements.

49. The article in accordance with claim 48, wherein said retroreflective elements are formed into said underlayer.

50. The article in accordance with claim 45, wherein said retroreflective elements are arranged to provide an encapsulated lens retroreflective construction.

51. The article in accordance with claim 45, wherein said retroreflective elements are arranged to provide an enclosed lens retroreflective construction.

52. The article in accordance with claim 45, wherein said article is signage which is suitable for outdoor use for at least three years.

53. A retroreflective article having fluorescent coloration, comprising:
an underlayer colored fluorescent film having at least one fluorescent dye within an underlayer acrylic resin polymer matrix;
an overlayer colored fluorescent film having at least one fluorescent dye within an overlayer polymer matrix, said overlayer polymer matrix having been formed from a polycarbonate or an acrylic resin;
a cap layer film of a polyarylate resin;
said overlayer colored fluorescent film overlies said underlayer colored fluorescent film, and said cap layer overlies said overlayer; and
said at least one fluorescent dye in one said film is different from any fluorescent dye in the other said film, the article has retroreflective members and has a selected fluorescent coloration different from the coloration of either said underlayer colored fluorescent film or said overlayer colored fluorescent film.

54. The article in accordance with claim 53, wherein said selected fluorescent coloration is fluorescent yellow having the following "x" and "y" chromaticity coordinates which are bounded by the following "x" and "y" chromaticity coordinates: (x=0.479, y=0.520), (x=0.446, y=0.483), (x=0.512, y=0.421) and (x=0.557, y=0.442).

55. The article in accordance with claim 53, wherein said retroreflective members are microprismatic elements.

56. The article in accordance with claim 55, wherein said retroreflective members are formed into said underlayer.

57. The article in accordance with claim 53, wherein said retroreflective members are arranged to provide an encapsulated lens retroreflective construction.

58. The article in accordance with claim 53, wherein said retroreflective members are arranged to provide an enclosed lens retroreflective construction.

59. The article in accordance with claim 53, wherein said article is signage which is suitable for outdoor use for at least three years.

60. The article in accordance with claim 53, wherein said fluorescent dye of the overlayer is selected from the group consisting of at least one benzoxanthene dye, at least one benzothiazine dye, and combinations thereof.

61. The article in accordance with claim 53, wherein said fluorescent dye of the underlayer is at least one perylene imide dye.

62. The article in accordance with claim 53, wherein the coloration of said underlayer colored fluorescent film is different from the coloration of said overlayer colored fluorescent film.

63. An article comprising:
an underlayer colored fluorescent film comprising at least one first fluorescent dye within an underlayer polymer matrix;
an overlayer colored fluorescent film comprising at least one second fluorescent dye within an overlayer polymer matrix;
a cap layer polymeric film comprising a polymeric resin, said polymeric resin comprising at least one polymer, or a mixture thereof, selected from the group consisting of:
(i) polymers having a polymeric backbone comprising the following repeating moiety A:
(i) polymers having a polymeric backbone comprising the following repeating moiety A:

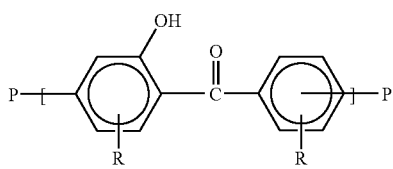

A wherein R is a non-interfering substituent and P is the remainder of the polymer; and
whereby the polymers are able to absorb ultraviolet light; and
(ii) polymers having a polymeric back bone comprising the following repeating moiety B:

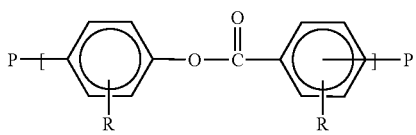

B wherein R is a non-interfering substituent and P is the remainder of the polymer;
said moiety B being transformable to said moiety A by photo-pries rearrangement, whereby said polymer comprising moiety B can be transformed to an ultraviolet light absorbing polymer comprising moiety A
the article has said overlayer colored fluorescent film over said underlayer colored fluorescent film and said cap layer overlies said overlayer; and
said article has a selected fluorescent coloration different from both said underlayer colored fluorescent film and said overlayer colored fluorescent film.

64. The article in accordance with claim 63, wherein said cap layer comprises a polyarylate resin.

65. The article in accordance with claim 64, wherein the polyarylate resin comprises at least one polymer selected from the group consisting of polyarylate polymers comprising one or both of the following repeating structures I and II:

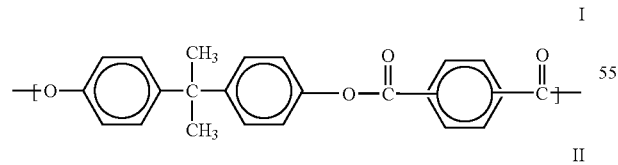

I

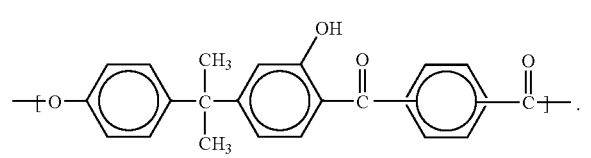

II

66. The article in accordance with claim 63, wherein the cap layer comprises a blend of polyarylate and at least one additional polymer.

67. The article in accordance with claim 66, wherein said additional polymer is selected from the group consisting of polycarbonate, poly(cyclohexanedimethanol terephthalate), poly(cyclohexanedimethenol-co-ethylene terephthalate), and blends thereof.

68. The article in accordance with claim 67, wherein said additional polymer of the cap layer comprises polycarbonate.

69. The article in accordance with claim 63, wherein said overlayer colored fluorescent film has better fluorescent color stability than said underlayer colored film.

70. The article in accordance with claim 63, wherein said underlayer polymer matrix has a polymer structure selected from the group consisting of an acrylic resin, a polystyrene, a polyvinyl chloride, a polyester, a polyarylate, a styrene-acrylonitrile copolymer, a polyurethane, and combinations and copolymers thereof.

71. The article in accordance with claim 63, wherein said overlayer polymer matrix has a polymer structure selected from the group consisting of a polycarbonate, an acrylic resin, a polyarylate resin, and combinations and copolymers thereof.

72. The article in accordance with claim 71, wherein said selected fluorescent coloration of the article is fluorescent yellow.

73. The article in accordance with claim 63, wherein said overlayer colored fluorescent film substantially blocks light having a wavelength from about 250 nm to about 520 nm.

74. The article in accordance with claim 63, wherein said article includes retroreflective elements formed into said underlayer.

75. The article in accordance with claim 63, wherein said fluorescent dye of the overlayer is a benzoxanthene dye, a benzothiazine dye or combination thereof.

76. The article in accordance with claim 63, wherein said fluorescent dye of said underlayer film is at least one perylene imide dye.

77. The article in accordance with claim 63, wherein the coloration of said underlayer colored fluorescent film is different from the coloration of said overlayer colored fluorescent film.

78. A retroreflective sheeting article comprising:
an underlayer colored fluorescent film comprising at least one perylene imide fluorescent dye within an acrylic resin underlayer polymer matrix;
an overlayer colored fluorescent film having at least one benzoxanthene fluorescent dye within an acrylic resin overlayer polymer matrix, said overlayer colored fluorescent film has better fluorescent color stability than said underlayer colored film;
the article has retroreflective members, said overlayer colored fluorescent film being over said underlayer colored fluorescent film;
said at least one fluorescent dye in one said film is different from any fluorescent dye in the other said film, and
said article has a selected fluorescent coloration different from both said underlayer colored fluorescent film and said overlayer colored fluorescent film.

* * * * *